(12) United States Patent
Jueneman et al.

(10) Patent No.: US 9,049,010 B2
(45) Date of Patent: Jun. 2, 2015

(54) PORTABLE DATA ENCRYPTION DEVICE WITH CONFIGURABLE SECURITY FUNCTIONALITY AND METHOD FOR FILE ENCRYPTION

(71) Applicant: Spyrus, Inc., San Jose, CA (US)

(72) Inventors: Robert R. Jueneman, Milpitas, CA (US); Duane J. Linsenbardt, San Jose, CA (US); John N. Young, San Jose, CA (US); William Reid Carlisle, St. Petersburg, FL (US); Burton George Tregub, Encino, CA (US)

(73) Assignee: Spyrus, Inc., San Jose, CA (US)

( * ) Notice: Subject to any disclaimer, the term of this patent is extended or adjusted under 35 U.S.C. 154(b) by 0 days.

(21) Appl. No.: 13/650,459

(22) Filed: Oct. 12, 2012

(65) Prior Publication Data
US 2013/0046993 A1    Feb. 21, 2013

Related U.S. Application Data

(63) Continuation of application No. 12/018,094, filed on Jan. 22, 2008, now abandoned.

(60) Provisional application No. 60/886,087, filed on Jan. 22, 2007.

(51) Int. Cl.
| | |
|---|---|
| H04L 9/08 | (2006.01) |
| G06F 21/32 | (2013.01) |
| G06F 21/62 | (2013.01) |
| G06F 21/72 | (2013.01) |
| H04L 9/32 | (2006.01) |

(Continued)

(52) U.S. Cl.
CPC ............... *H04L 9/085* (2013.01); *G06F 21/32* (2013.01); *G06F 21/6218* (2013.01); *G06F 21/72* (2013.01); *G06F 2221/2113* (2013.01); *G06F 2221/2153* (2013.01); *H04L 2209/80* (2013.01); *H04L 9/0822* (2013.01); *H04L 9/0861* (2013.01); *H04L 9/0877* (2013.01); *H04L 9/3226* (2013.01); *H04W 12/02* (2013.01); *H04W 12/04* (2013.01); *H04W 12/06* (2013.01)

(58) Field of Classification Search
CPC ........................................................ H04L 9/085
USPC ............................... 380/28, 44, 277; 713/150
See application file for complete search history.

(56) References Cited

U.S. PATENT DOCUMENTS

| | | |
|---|---|---|
| 5,457,746 A | 10/1995 | Dolphin |
| 5,677,953 A | 10/1997 | Dolphin |

(Continued)

*Primary Examiner* — William Powers
(74) *Attorney, Agent, or Firm* — Robert J. Rose; Law Office of Robert Rose

(57) ABSTRACT

A portable encryption device with logon access controlled by an encryption key, with an on board cryptographic processor for reconstituting the encryption key from a plurality of secrets generated by a secret sharing algorithm, optionally shrouded with external secrets using an invertible transform resistant to quantum computing attacks. Another embodiment provides file decryption controlled by a file encryption key, with the on board cryptographic processor reconstituting the file encryption key from a version of the file encryption key which has been shrouded with a network authorization code. A method for encryption of a plaintext file by hashing, compressing, and encrypting the plaintext file, hashing the ciphertext, hashing the plaintext hash and the ciphertext hash, and sealing the ciphertext together with the resulting hash. A portable encryption device for performing the method is also disclosed.

42 Claims, 9 Drawing Sheets

(51) Int. Cl.
  *H04W 12/04* (2009.01)
  *H04W 12/06* (2009.01)
  *H04W 12/02* (2009.01)

(56) References Cited

U.S. PATENT DOCUMENTS

| | | |
|---|---|---|
| 5,703,951 A | 12/1997 | Dolphin |
| 5,857,025 A | 1/1999 | Anderson et al. |
| 5,937,063 A | 8/1999 | Davis |
| 5,937,066 A * | 8/1999 | Gennaro et al. ............ 380/286 |
| 6,003,135 A | 12/1999 | Bialick et al. |
| 6,035,041 A * | 3/2000 | Frankel et al. ................ 380/30 |
| 6,055,508 A * | 4/2000 | Naor et al. ................ 705/7.38 |
| 6,088,802 A | 7/2000 | Bialick et al. |
| 6,122,742 A * | 9/2000 | Young et al. .................... 726/10 |
| 6,292,898 B1 | 9/2001 | Sutherland |
| 6,295,602 B1 | 9/2001 | Weissman et al. |
| 6,708,273 B1 | 3/2004 | Ober et al. |
| 6,816,965 B1 | 11/2004 | Moore et al. |
| 6,848,050 B1 | 1/2005 | Merman et al. |
| 6,904,523 B2 | 6/2005 | Bialick et al. |
| 6,928,476 B2 | 8/2005 | Bucher |
| 6,970,849 B1 | 11/2005 | DeMello et al. |
| 6,971,022 B1 | 11/2005 | Katta et al. |
| 6,981,149 B1 | 12/2005 | Housley et al. |
| 6,993,137 B2 | 1/2006 | Fransdonk |
| 7,043,025 B2 | 5/2006 | Alldredge |
| 7,043,643 B1 | 5/2006 | Doe et al. |
| 7,143,437 B2 | 11/2006 | Royer et al. |
| 7,313,825 B2 * | 12/2007 | Redlich et al. ................ 726/27 |
| 7,366,904 B2 * | 4/2008 | Roh et al. ..................... 713/175 |
| 7,707,426 B2 * | 4/2010 | Lauter et al. ................ 713/180 |
| 7,814,318 B1 * | 10/2010 | Perlman et al. ............. 713/165 |
| 8,050,409 B2 * | 11/2011 | Agrawal et al. ............. 380/278 |
| 2002/0010679 A1 | 1/2002 | Felsher |
| 2002/0129261 A1 | 9/2002 | Cromer et al. |
| 2002/0164033 A1 * | 11/2002 | Rajasekaran ................ 380/278 |
| 2002/0169971 A1 | 11/2002 | Asano et al. |
| 2003/0026432 A1 | 2/2003 | Woodward |
| 2004/0039829 A1 | 2/2004 | Bucher |
| 2004/0039924 A1 | 2/2004 | Baldwin et al. |
| 2004/0139024 A1 | 7/2004 | So |
| 2004/0199779 A1 | 10/2004 | Huang |
| 2005/0010758 A1 | 1/2005 | Landrock et al. |
| 2005/0102512 A1 | 5/2005 | Goh et al. |
| 2005/0125536 A1 | 6/2005 | Bucher |
| 2006/0013400 A1 | 1/2006 | Sutton et al. |
| 2006/0130129 A1 | 6/2006 | Dai et al. |
| 2006/0242423 A1 * | 10/2006 | Kussmaul .................... 713/182 |
| 2006/0277406 A1 | 12/2006 | Hashimoto et al. |
| 2007/0076867 A1 | 4/2007 | Yeung et al. |
| 2007/0106892 A1 | 5/2007 | Engberg |
| 2008/0263363 A1 * | 10/2008 | Jueneman et al. ........... 713/184 |

* cited by examiner

PORTABLE DATA ENCRYPTION DEVICE WITH CONFIGURABLE SECURITY FUNCTIONALITY AND METHOD FOR FILE ENCRYPTION

CROSS-REFERENCE TO RELATED APPLICATIONS

The present Application claims the benefit of U.S. Provisional Patent Application No. 60/886,087 titled "Modular Portable Storage Device And System With Configurable Security Functionality" filed Jan. 22, 2007, and is a continuation of U.S. Nonprovisional Patent Application No. 12/018,094, titled "Portable Data Encryption Device With Configurable Security Functionality and Method for File Encryption", filed Jan. 22, 2008, now abandoned, the contents of both of which are incorporated by reference in this disclosure.

BACKGROUND OF THE INVENTION

The creation of proprietary digital information is arguably the most valuable intellectual asset developed, shared, and traded among individuals, businesses, institutions, and countries today. This information is mostly defined in electronic digital formats, e.g., alphanumeric, audio, video, photographic, scanned image, etc. The exposed storage and transport of this proprietary information, particularly for the purposes of sharing among separate collaboration groups, has significantly increased the risk of interception and theft by criminal elements, competitors, amateur thieves, computer hackers, terrorists, or political or industrial spies.

Simultaneously, there is an increased need for mobility of such data by physical or logical transport between home and office, or from office to office(s) among designated recipients. The dramatic increase in the velocity of business transactions and the fusion of business, home, and travel environments has accelerated sharing of this proprietary commercial, government, and military digital information. To facilitate sharing and mobility, large amounts of valuable information may be stored on a variety of portable storage devices (e.g., memory cards, memory sticks, flash drives, optical and hard disc magnetic media) and moved among home and office PCs, portable laptops, PDAs and cell phones, and data and video players and recorders. The physical mobility of these storage devices makes them vulnerable to theft, capture, loss, and possible misuse. Indeed, the storage capacity of such portable storage devices is now approaching a terabyte, sufficient to capture an entire computer operating environment and associated data. This would permit copying a targeted computer on the storage media and replicating the entire data environment on an unauthorized "virgin" computer or host device.

Another trend in data mobility is to upload and download data on demand over a network, so that the most recent version of the data is always accessible and can be shared only with authorized users. This facilitates the use of "thin client" software and minimizes the cost of storing replicated versions of the data, facilitates the implementation of a common backup and long-term storage retention and/or purging plan, and may provide enhanced visibility and auditing as to who accessed the data and the time of access, as may be required for regulatory compliance. However, thin client software greatly increases the vulnerability of such data to hackers who are able to penetrate the firewalls and other mechanisms, unless the data is encrypted on the storage medium in such a way that only authorized users could make sense of it, even if an unauthorized user were able to access the encrypted files.

There is a balance among legal, economic, national security, and pragmatic motivations to develop robust security implementations and policies to protect the storage of proprietary digital information, based on the value of the information, the consequences of its exposure or theft, and the identification and trust associated with each of the targeted recipients. In order to provide such varying degrees of protection for portable storage devices, system methods and application functionality must be developed and easily integrated into the operating procedures of the relevant institutions. Different policies defining degrees of protection are required to economically accommodate and adapt to a wide range of targeted recipient audiences for this data.

Currently and predominantly, for portable storage devices, passwords and software solutions are used for such purposes as encryption of information and to provide the authentication functions to access and manipulate private intellectual property. The sophistication of literally millions of mathematicians, computer engineers and scientists, many of whom can be hostile to the protection of digital intellectual property for economic, political, or frivolous purposes, represents a great threat to the efficacy of simple implementations of password security and software encryption systems currently implemented on such portable encryption devices. Furthermore, the difficulty and, in some cases, the inability to change security policies for access to such data forms yet another barrier to the commercial and institutional interests of the owners of the intellectual property in controlled and directed sharing of such information, and of the user's ability to retrieve, search, and store such data in their daily activities.

In contrast, some users have adopted the use of hardware-based encryption solutions in order to prevent these problems, only to discover a few years later that their data was irretrievable because their cryptographic token was lost, stolen, or malfunctioned and they had no backup or recovery agent capability, or that interesting or even vital historical records could not be read because no information exists as to what keys were used to encrypt the documents, or what tokens or PINs were used. It is easy to imagine that if these issues are a significant problem today, then the problem of encrypting data for personal privacy for 40 or 50 years, or even the life of the individual, will become overwhelming.

What is needed are highly robust and proven security techniques incorporated into new system methods and into new commercially available portable storage hardware apparatus to implement configurable security policies for accessing information through rigorous authentication means, to secure the information with certified levels of accepted cryptographic technology, and to rigorously control the environment within which the information is shared.

What is needed is a secure portable storage apparatus and method of encrypting and sealing (via a combination of secure hash and digital signature technologies) digital information files and storing them in the device's integral or removable memory, or alternatively on the host device's memory or other ancillary memory storage devices, while operating under cryptographically protected security policies for transport and authorized access to such digital information.

It is essential that the portable encryption device provide and make use of a highly secure logon mechanism, to ensure that a user is not allowed to or even be capable of operating the device in order to encrypt, decrypt, sign, or verify the data, or perform various other sensitive operations unless and until that user has been specifically authenticated and authorized in accordance with the organization's security policies and procedures. To this end, it would be very desirable for the device to support the use of a secure PIN entry mechanism, as well as supporting an optional biometric identification mechanism, and various other optional enhanced authentication devices, functions, and methods.

Because the secure portable encryption device may be used in a high threat and high-risk environment, there is the possibility that the device could be lost, stolen, or captured by competitive or criminal forces, and later disassembled and even reverse engineered by a sophisticated and capable adversary. For this reason, it is highly desirable that it be impossible for such an organization to extract the user's authorization PIN or password, biometric template, or other enhanced authentication/authorization parameters, or any of the private keys or critical cryptographic parameters, either from the data itself, the encryption device itself, or from the cryptographic processor, or from combination of the three.

There is a need for secure physical and logical transport of data for multiple recipients. To this end, it is desirable to provide a means of securely transporting data from one place to another, if the user has to carry the data with him or her, or physically transport the data and the secure encryption device, and somehow communicate the information necessary to log on and access the data by another authorized user. What is required are a multiplicity of methods to securely transport the encrypted data, either physically or logically, between an Originator user and one or more authorized Recipient users of devices and host computers that are operating within authorized enclaves or domains, or are members of certain authorized Communities of Interest.

An "enclave" is considered to consist of one or more host computers operating within a single organization or enterprise and under the control of a common security administration, typically subject to some level of physical security, and within which there is some reasonable expectation of interoperability with respect to the use of the subject invention. An example of an enclave would be the computers used within a single corporate campus, such that an employee could insert and use the secure portable secure encryption device. An enclave may be restricted in its scope to include only those host computers that are authorized to process information of a particular type, e.g., Engineering, Human Resources, or Finance. A given host computer may be authorized to be a member of multiple enclaves. A "domain" is considered to consist of one or more enclaves distributed across one or more enterprises or organizations, all operating within a common security framework and policy. An example would be a collection of computers operating at the SECRET level throughout a portion of the Department of Defense, including civilian contractors and other cleared users. A "Community of Interest" is typically a more loosely defined set of host processors and users who all share a common interest and "Need to Know," even if (in some cases) that interest spans enclaves and domains and even governmental boundaries. An example would be communications between the U.S. military and our allied and coalition partners, and in some cases even indigenous tribal authorities and informal collaborators. In the civilian or social networking sphere, a community of interest might include "Friends and Family," a chat room, membership on a professional or social e-mail or blog list, etc.

In many environments, it is not sufficient merely to restrict the physical access and ability to log on to the device to certain host computers within a given enclave. Instead, there is a need for restricted communication and data containment, and it is necessary to constrain encrypted communications to those members of a pre-defined Community of Interest, so that no one outside of that Community of Interest could possibly decrypt the message. Such a mechanism could be used to enforce Mandatory Access Controls (e.g., clearance levels, compartments, and/or caveats in the military), or a defined Need-To-Know for various proprietary or sensitive types of information in commercial enterprises.

It is very important to provide a mechanism for data confinement, such that the secure portable encryption device can only be used in combination with an authorized host-computing device. In a military environment, such a mechanism would prevent the encrypted data from being compromised even if the user were coerced into divulging or entering the PIN or password and activating any biometric sensors. In a commercial enterprise environment, such a mechanism could be used to prevent an authorized user from accessing and storing proprietary or personal of data and later decrypting them on his home computer without proper authorization, for personal gain, vicarious pleasure, or purposes that are more nefarious.

Similarly, in multiple-recipient data sharing modes of operation, it would be highly desirable to provide one or more system methods or means to control access and cryptographic operations, so that the data contained in or secured by such a secure portable encryption device can only be encrypted on behalf of, and decrypted by, an authorized user, and only on an authorized host computing device as dictated by the security policies of the enclave, domain, or Community of Interest; and not by just anyone who may possess an encryption key pair that could be used in the encryption/decryption process. It would also be highly desirable to ensure that the data is authenticated as having originated by a given user, and to provide nonrepudiation-level protection against manipulation or substitution of the data by an attacker.

It would also be highly desirable if a "blocking" or "guard processor" can be provided to ensure that only encrypted and sealed information can be written to or read from designated input/output ports or devices, including removable media. Similarly, it would be highly desirable to support the use of a "black" guard processor that could examine any incoming or outgoing traffic on a communications link to ensure that it was properly encrypted and had not been modified prior to allowing it to be transmitted or received, without the necessity of providing the guard processor the ability to decrypt the data. A "red" guard processor could also be used to decrypt and examine the data for specified sensitive context prior to either releasing it for transmission or, if sensitive data is identified, returning it to the originator with instructions to delete the sensitive data, and perhaps raising an alarm or log event that proper policies have not been followed.

There is a need for very long term data recovery mechanisms, and in order to conform to various regulatory and organizational governance requirements, it is desirable that one or more recovery agents be supported, possibly of different types, so that the encrypted data can be decrypted if necessary, even if the original cryptographic keys have been lost and the original user's PIN forgotten. Preferably, the necessary information to support this recovery must be embedded in the encrypted data itself.

In the case of small businesses or home users, it may be important to provide some form of an inexpensive Recovery Agent capability that can be used in conjunction with a primary encryption device to decrypt and recover data on a one-time-only basis. Because such a device or means will only be used in the event of the loss or malfunction of the primary device, it may be sufficient (and desirable from a marketing perspective) if the functionality can be limited to a decrypt-only mode of operation. For this reason, it is desirable to support a hybrid mode of operation, providing a static private Elliptic Curve Cryptography ("ECC") key within a security processor or token, to be used for decryption only; with the symmetric key encryption being performed in software, or at a very bandwidth-limited rate in hardware.

Because it is difficult to predict the course of history, the possibility of natural disasters, the failure or obsolescence of the hardware device, and even the dissolution of the original equipment vendor or the user's organization, it is desirable that a highly robust solution be devised to enable distant generations to read the data easily, while at the same time protecting the data as securely as possible for the current generation. This requires what we define as "strong but brittle cryptography"—a cryptographic system that will resist all known attacks for a well-defined period of years or decades, and then will suddenly "snap" and provide relatively simple access to the data by future historians. Because it is difficult to ensure that any hardware mechanism will survive for many decades without failure, in addition to the hybrid decryption function described previously, it is desirable to support a decrypt-only function in a purely software means or mechanism, so that the inevitable changes in computers, operating systems, applications, and even programming languages can be accommodated by updating or porting the software functionality to the future environment.

Finally, it must be recognized that the long-term storage of encrypted data presents some very difficult problems in sorting, searching, or even finding any data that is relevant to a particular subject, without being forced to decrypt the entire archive in order to find something. This process is difficult enough if the document is a text document that can be searched relatively easily, but if the information that is sought is a photograph, drawing, sound recording, musical score, computer program, or other more abstract data type, then the search process can be very difficult indeed. In addition to the search difficulty, there is a cost associated with the long-term storage of any kind of data, encrypted or not, and it is often necessary to make an intelligent decision as to what to save and what to discard. But if the information is encrypted, making that decision effectively requires that the information be decrypted in order to examine it, and that may not be practical if terabytes, exabytes, or even petabytes of data are involved. For this reason, it would be desirable if metadata—data about the data—could be saved along with the encrypted data itself. This metadata might or might not be as sensitive as the data itself, just as the subject of an e-mail might or might not be particularly revealing. In some cases, it may not be necessary to encrypt the metadata at all, and in other cases, it may be sufficient to encrypt the metadata using a key that is common across many such files or messages, and is shared with a central archive, catalog, or directory facility. It is therefore desirable to provide a mechanism for attaching metadata to the encrypted file in such a manner as to facilitate the cataloging and subsequent discovery of the contents of the files involved, and allowing the metadata to be sent in the clear, or encrypted in a common key or keys of the archive facility or catalog.

In modern communications systems, data, typically in the form of a file, may be communicated, relayed, and stored over a large number of communications and storage media, each of which has some small but finite probability of introducing an error into the transmission or storage of that information. Even if the error is later detected, it may not be possible to correct it if the original source is no longer available. In particular, depending on the Mode of Operation of the cryptographic system, an uncorrected error may cause error propagation throughout the remainder of the decrypted file or message after the point of the error, rendering the data completely unintelligible. This is a particular problem in the case of one-way transmissions, e.g., when the recipient is operating under "EMCON" (emissions control) or radio silence conditions, as well as for one-way storage or archive operations. Although it may not possible to prevent such errors completely, it is desirable to have robust error detection and correction, and to make use of Forward Error Correction techniques that are embedded in the file or message itself, and therefore can be used to recover errors on an end-to-end basis, rather than having to rely on the proper operation of every intermediate link and storage mechanism.

In implementing all of the above functionality, it is highly desirable that the methods and apparatus use encryption/decryption and digital signing techniques and related private key and public key algorithms and key sizes that are preferred by the communities of users or have been adopted by international or national standards, or are proprietary to unique institutions. One preferred cryptographic embodiment and implementation is currently (year 2008) represented by the "Suite B" algorithms for both unclassified and classified use by the U.S. Government. Suite B consists of Elliptic Curve Cryptography (ECC) in the prime field GF(P) using key sizes P-256 and P-384 for key establishment between two parties as well as for digital signature creation and verification; the Advanced Encryption Standard (AES) with keys sizes of 128 or 256 bits for symmetric key encryption; and the updated Secure Hash Algorithms (SHA-256 and SHA-384). Reference is also made to U.S. Pat. No. 6,088,802, "Peripheral Device With Integrated Security Functionality," and U.S. Pat. No. 6,003,135, "Modular Security Device," both of which are incorporated by reference in their entirety.

At the present time, extrapolating the increase in performance and scale of existing technology indicates that the ECC P-384 keys should resist attacks by even nation-states for well over 100 years. However, the looming threat on the horizon is the possibility of highly parallel computations made possible by a form of computation called "quantum computing." At present, many of the cryptographic protocols, including RSA and ECC are believed to be secure, in that the effort which would be required to break them is considered computationally infeasible. The possibility that quantum computing might become feasible would change this picture dramatically. If realized, the difficulty of most of these problems would drop from exponential complexity to merely polynomial complexity, rendering currently deployed cryptographic systems and key lengths useless. Current expectations by knowledgeable people in the field are that quantum-computing attacks against ECC might become feasible within 30 to 50 years, and that we may have a better understanding of the threat within 10 years. At least at present, there does not seem to be a comparable threat against AES, particular AES-256. The possible threat against "SHA-2" is not known, but NIST has initiated a call for a next generation of hashing functions, "SHA-3." It is therefore desirable to resist quantum-computing attacks against ECC and against SHA-2 wherever possible.

Most prior art solutions to secure information on portable storage devices for transport to different host computing devices or for use by authorized users have certain vulnerabilities as a result of their reliance on software and unprotected hardware implementations, or on the long term, static, non-volatile, and accessible storage of important codes and cryptographic parameters. These vulnerabilities have become much more widely exploitable due to the readily available technological and intellectual resources possessed by well-funded criminal elements, rogue nations, terrorists, and political and military enemies. As of December 2006, as quoted in the New York Times, "Despite an almost four-andhalf-year campaign on the part of the company (Microsoft), and the best interests of the computer industry, the threat from harmful computer software continues to grow. Criminal attacks now range from programs that steal information from home and corporate PCs to growing armies of slave computers that are wreaking havoc on the commercial Internet." Many computer security companies say that there is a lively underground market for information that permits attackers to break into systems via the Internet through Trojan horses among other hardware and software means of invasion of processors and software.

Attacks on personal computers and commercial, government and military data are now commonplace; indeed, identity theft of passwords is the largest white-collar crime in the United States. Yet passwords and PINs (Personal Identification Numbers), in most cases generated by human beings who are tempted to use native-language words, Social Security Numbers, telephone numbers, etc., are still the most used access security methods for protecting portable encryption devices, and among the most vulnerable to both brute force dictionary attacks as well as sophisticated logic tracing. Professional criminal attackers and even amateur hackers now have access to sophisticated software and supercomputing networks that can unknowingly invade processing devices and storage devices, trace software instruction sequences and memory locations, and by knowing or discovering the algorithms being used, intercept and copy encryption keys, PINs, and other profile data used to protect the access to stored content. They can exploit vulnerabilities in the underlying commercial software, or in the construction of the integrated circuit chips housing and executing the cryptographic processes, or in the specialized cryptographic software, which enables exposing keys and access parameters at some deterministic point in the processing sequence. Industrial laboratory facilities are also available to read the data content stored in memory cells by measuring the electronic charge through the use of electronic beam microscopes, and thus steal stored PINs, keys, and therefore access the previously protected data.

One of the key deficiencies of prior art, therefore, is the widespread reliance on a stored PIN or password that is used for comparison purpose, for access control, or used for password-based encryption to protect other cryptographic variables. Typically, the value that is stored is not the PIN itself, but a hashed or otherwise obfuscated version of the PIN, e.g., in the form produced by a PKCS#5 process. In the case of a password-based encryption process, the PIN itself may not be stored, but only the encrypted key, which may then be used to encrypt other information. In any case, however, some kind of a value is stored, and if it is possible to locate and extract that value, then in general it is then possible to mount an offline exhaustive search attack against the PIN itself, with no constraints as to the amount of time, number of unsuccessful attempts, or the number of networked distributed processors that may be applied to such an effort. Many of the more celebrated attacks against Digital Rights Management and copy protection systems for digital media, for example, have been successfully carried out by such means.

Prior art is also directed at methods of cataloging user access at different security sensitivity levels and in different communities of interest through implementation of access control tables generally located at centralized servers. These tables are controlled by an institution's centralized policies that specify predetermined access rights for each of a plurality of users relative to data resources which themselves are identified with predetermined levels of security. Access tables further include domain and rule information for each user to control the collection of domains and conditions of authorization of their security rights. Such systems are optimized for protecting access to centralized sensitive data but are not adaptable to secure the user authorization and access and decryption rights to data which is transportable via portable storage media. Since the table data is external to the secured media on which the data is stored, the processes to authenticate the user and authorize decryption of the data are generally not cryptographically secure nor are they adaptable to be implemented by the portable storage device itself, even with the presence of processing capability on the device.

Many prior art methods exist for the key management protection necessary for securing key encryption keys for large groups of users. Split-key secret sharing schemes have been proposed whereby the decryption key is split and shared among multiple parties or entities to be combined to reconstitute the decryption key. In these cases, however, the individual secret shares themselves are maintained statically in multiple storage devices, generally on-line, where they are susceptible to attackers, particularly from within the institution, who can target the secret shares and recombine then to form the decryption key. Such solutions are implemented for relatively static configurations of computing and storage devices and related communities of interest or tiers of users, and have not addressed the ability to so protect key encrypting keys when the data itself, and the means to encrypt and decrypt the data and to generate and recombine the shared secrets, are on a portable device.

SUMMARY OF THE INVENTION

The present invention addresses these issues and severely mitigates or eliminates vulnerabilities or requires levels of time and effort that could well render the value of the information as insignificant by the time it could be exposed as plaintext. Through the use of the methods, apparatus, and system represented by the invention, together with the selection of available manufacturing techniques for protection of circuit chip contents by means of physically bonded sealing and shielding, self-destructive anti-tampering logic to zeroize memory contents, and advanced techniques for mitigating so-called side-channel attacks, a commercially affordable and superior security solution for protecting the access to portable stored data by unauthorized host computing devices or unauthorized users can be introduced to the public.

A portable encryption device with logon access controlled by an encryption key is disclosed comprising an enclosure for the device providing a portable form factor, and a cryptographic processor within the enclosure for reconstituting the encryption key from a plurality of secrets generated by a secret sharing algorithm. The secret sharing algorithm may comprise a K out of N secret sharing mechanism, such as Shamir's Secret-Sharing Algorithm with Lagrange interpolation. The encryption key may be, for example, a master key encryption key, or application key encryption key.

Optionally, one or more of the generated secrets have been shrouded with one or more external secrets using an invertible transform, such that any one of the external secrets may be changed without recreation or re-dealing of all of the plurality of generated secrets. A suitable invertible transform is XOR. One or more of the external secrets may comprise a user's PIN, which may be a supervisory user's PIN. Still further embodiments are possible where the external secrets comprise a plurality of user's PINs, and the transform is invertible with less than all of the plurality of user's PINs.

Other embodiments of the external secrets are possible, such as where one or more of the external secrets comprise a firmware hash, one or more of the external secrets comprise a host authorization code associated with one or more specific host computing devices, binding the portable encryption device to such one or more host computing devices, or one or more of the external secrets is generated by a proximity detection mechanism. An external secret can also be a function of multivariate parameters, such as geographic-locus or biometric input. Optionally, the external secrets are communicated over a secure channel with a secondary device, such as a connected host computing device, or a remote device.

Means for interfacing with a user authentication device can be added, such as a secure PIN entry mechanism, or secure biometric input. Still further embodiments comprise removable memory configured for data storage, a data communication module, or additional cryptographic processors within the enclosure. The cryptographic processor may be a microprocessor that has been programmed to execute cryptographic functions.

A method for controlling logon access on a portable encryption device having a portable form factor and a cryptographic processor is disclosed, comprising generating a plurality of secrets by a secret sharing algorithm, configuring the cryptographic processor to reconstitute an encryption key from the plurality of generated secrets, and determining logon access as a function of the reconstituted encryption key. The secret sharing algorithm may comprise a K out of N secret sharing mechanism, such as Shamir's Secret-Sharing Algorithm with Lagrange interpolation. The encryption key may be, for example, a master key encryption key, or application key encryption key.

Optionally, a further step can be added of shrouding one or more of the generated secrets with one or more external secrets using an invertible transform, such that any one of the external secrets may be changed without recreation or re-dealing of all of the plurality of secrets. A suitable invertible transform is XOR. One or more of the external secrets may comprise a user's PIN, which may be a supervisory user's PIN. Still further embodiments are possible where the external secrets comprise a plurality of user's PINs, and the transform is invertible with less than all of the plurality of user's PINs.

Other embodiments of the external secrets are possible, as noted above. Optionally, a further step can be added of communicating the external secrets over a secure channel with a secondary device, such as a connected host computing device, or a remote device. In a still further embodiment, a step is added of receiving input from a user authentication device, such as secure biometric data, optionally over a secure channel.

A portable encryption device with file decryption controlled by a file encryption key is disclosed comprising an enclosure for the device providing a portable form factor, and a cryptographic processor within the enclosure for reconstituting the file encryption key from a version of the file encryption key which has been shrouded with a network authorization code.

A method for controlling file decryption with a portable encryption device having a portable form factor and a cryptographic processor is disclosed, comprising generating a network authorization code, distributing the network authorization code to a community of interest through an out-of-band distribution mechanism, shrouding a file encryption key with the network authorization code using an invertible transform, receiving the network authorization code from a user, causing the cryptographic processor to reconstitute the file encryption key from the received network authorization code, and determining file access as a function of the reconstituted file encryption key. An encrypted file may then be decrypted as a function of the reconstituted file encryption key. The invertible transform may be XOR, or an invertible transform that is resistant to quantum computing attacks. In a further step, the network authorization code is encrypted and code is distributed to a recovery agent.

A method for file encryption of a plaintext file is disclosed, comprising the steps of hashing the plaintext file to produce a plaintext hash, compressing the plaintext file, encrypting the compressed plaintext file to create ciphertext, hashing the ciphertext to produce a ciphertext hash, hashing the plaintext hash and the ciphertext hash to produce a result hash, and sealing the ciphertext together with the result hash using a digital signature algorithm to produce the encrypted file. The encrypted file may be communicated to originator-selected optional recipients. A portable encryption device having a portable form factor and an on-board cryptographic processor may be used to perform the method.

Further optional embodiments provide for an enforced mandatory recovery agent, breaking the encryption of the encrypted file at a pre-determined date, or embedding forward error correction within the encrypted file.

Where the plaintext file has metadata, a further embodiment separately encrypts the metadata, and the seals the ciphertext together with the result hash and the encrypted metadata. Optional further steps for independent key exchange mechanism to permit decrypting the metadata by catalog agent are possible.

DETAILED DESCRIPTION

Figure 1:
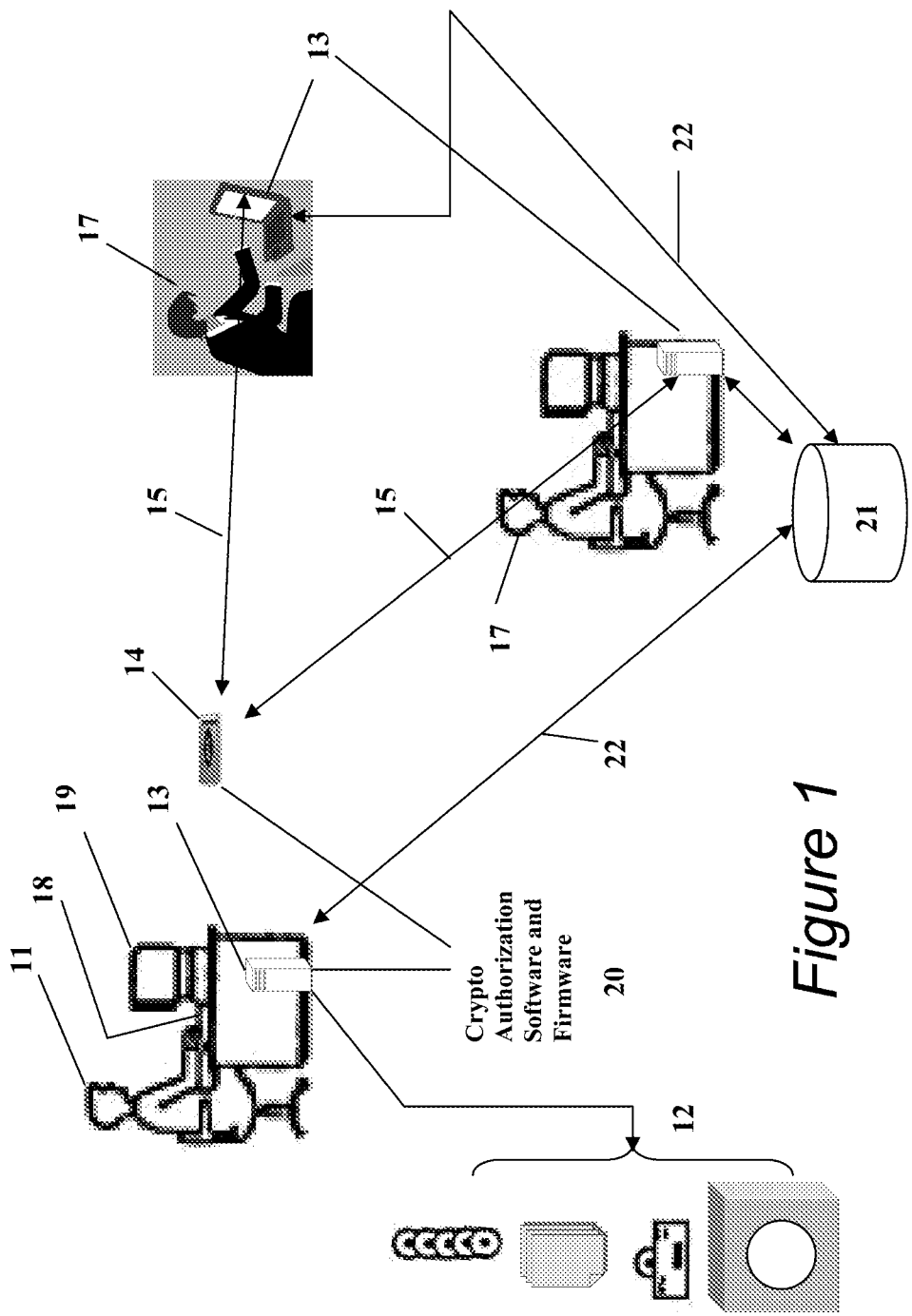
FIG. 1 is a block diagram of one embodiment of how a SPED can be utilized.

In accordance with the present invention, cryptographic operations are implemented on data for secure storage and transport by means of a system comprised of one or more than one secure portable encryption device ("SPED") capable of such cryptographic operations, and optionally storing and communicating such secure data to host or peripheral devices, one or more than one host computing device ("HCD"), and means for securely protecting access to that data. One embodiment of the means for securely protecting data is to permit access and cryptographic operations on that data only to authorized recipients, or only on authorized host computing devices, by a "K of N" split-knowledge sharing algorithm method of generating and cryptographically assigning shrouded secret shares which are bound to authentication/authorization means such as shareholder PINs, passwords, Host Authorization Codes (HAC), or other host, SPED, or other user authentication/authorization means as will be known to one or ordinary skill in the art with reference to this disclosure. Another embodiment of the means for securely protecting data is to utilize a Network Access Code ("NAC") as part of a shrouding operation on file encryption keys. Another embodiment is a method for file encryption of a plaintext file, comprising the steps of hashing the plaintext file to produce a plaintext hash, compressing the plaintext file, encrypting the compressed plaintext file to create ciphertext, hashing the ciphertext to produce a ciphertext hash, hashing the plaintext hash and the ciphertext hash to produce a result hash, and sealing the ciphertext together with the result hash, to produce the encrypted file. These and other embodiments will now be discussed in detail. It should be noted that these embodiments could be used alone, or in combination.

As will be understood by those skilled in the art, the phrase "cryptographic operation" includes hashing, encryption/decryption, digital signature/verification, and sealing (e.g., hashed and digitally signed ciphertext). The term "PIN" (Personal Identification Number) is used herein to designate a (typically short) series of numbers, an alphanumeric password, or a lengthy passphrase consisting of arbitrary words, letters, numbers, and/or special characters without limitation.

In one embodiment, the SPED is used to communicate with the HCD to enable one or more cryptographic operations to be performed by the SPED on data provided from the HCD to the SPED (which data can then be, for example, stored in the SPED or returned to the HCD for storage) or on data that has been transmitted by wire or wireless means to the SPED from another device, or input to the SPED by a person.

In another embodiment, the data may be represented and stored as individually encrypted and/or sealed files. In general, the process of hashing, compressing, encrypting, and digitally sealing the file results in a new object that may be of considerably different size, either larger or more often smaller than the original, with the result that the encrypted file cannot simply replace the original file. As a result, the act of storing the encrypted file must involve interactions with the directory or File Allocation Table in ways that the originating program or operating system cannot easily discern. For this reason, the means of encrypting these files may either be a straight pass-through, generally requiring the implementation of a file-handling system within the SPED itself, or the data may be looped-back to the HCD, either for storage locally, or for yet another pass, wherein the files are broken up into discrete sectors by the host operating system prior to being stored on the SPED, such that the SPED is not required to implement the required file processing logic.

Split-Knowledge Sharing Algorithm Method of Generating and Cryptographically Assigning Shrouded Secret Shares Which are Bound to Authentication/Authorization Means In one embodiment, the means of generating and distributing Host Authorization Codes for host computing devices on the basis of security policies allows an institution to permit users to securely move data back and forth among a multiplicity of computers in a defined enclave, for example, between a branch and a central office, but prevents a user from decrypting the data on an unauthorized machine, even if the user possesses the encrypted data, the SPED device containing the keys necessary to decrypt the data, and is in possession of the PIN/password required for access, and can even satisfy any biometric criteria, so long as he does not know the Host Authorization Code, or other Enhanced Authorization codes, devices, or methods. This invention dynamically defines and configures the authorized population and tiers of users, portable encryption devices, and host computing devices.

As will be described, the use of a set of K out of N shrouded secrets to reconstitute a Master Key Encryption Key involves the use of an exclusive-OR operation for the shrouding, and a mathematical algorithm (Shamir's secret sharing algorithm) involving N equations with K unknowns. Neither of those operations involve the use of cryptography in the conventional sense, and the difficulty of "breaking" such schemes does not depend upon any assumptions of computational intractability, but instead provide provable mathematical intractability. With respect to the K out of N secret sharing scheme, for example, if fewer than K shares are entered, or if any of the shares are entered incorrectly, then the results are mathematically indeterminate and no better than random guessing. Likewise, if even a single bit is in error in the shrouded calculation, then the result is simply incorrect, and provides absolutely no information that might aid an attacker.

For this reason, this embodiment of the invention provides mathematically provable security with regard to the reconstitution of the Master Key Encryption Key. Even if a very sophisticated laboratory attack could be used to "peel" the security processor chip and extract the contents, without the knowledge of K out of N of the authentication factors, it is mathematically impossible to recover any data, unless someone can break the AES-256 key wrapping algorithm.

Two Subsystems for Distributing Secret Shares and Host Authorization Codes

In one embodiment, two subsystems operate in conjunction for creating and distributing secret shares and Host Authorization Codes according to the authorized configuration of users, secure portable encryption devices, and host computing devices: (1) a hardware-based encryption device identified as the Secure Portable Encryption Device (SPED) that connects to a host computer device via an interface such as a Universal Serial Bus (USB 2.0 or 1.1), an ExpressCard™ interface, or other similar wired or wireless functionality, and contains its own integrated cryptographic security and operational processing capabilities and memory storage facilities, and (2) a general purpose computer, or a form of PC computer, PDA, cell phone, or other type of programmable computing device supporting applications software, referred to as the host computer device, which contains a suitable operating system, the necessary device drivers and other middleware, and an application program which provides the Graphical User Interface (GUI) to control the functionality.

Overview of the Major Functional Parts of the System

Referring to FIG. 1 of the drawings, the Originator/user 11 of data 12 is shown as part of the block diagram which depicts the various major functional parts of the system including the two apparatus subsystems, the secure portable encryption device 14 (hereinafter referred to as the SPED) and the host computing device 13 (hereinafter referred to as the HCD). It also illustrates the cryptographic system means 20 by which access to the stored content of the SPED 14 is authorized only for designated users 11 and HCDs 13. Data 12 is introduced into the system for the purpose of having some cryptographic operations performed on it (e.g., digital signature, hashing, encryption) in order that it may be secured in the HCD 13 to be securely transported 15, via the SPED 14, to another authorized HCD 13 for the originator's 11 use, or for use only by an authorized Recipient 17, and protecting the SPED 14 so that, if lost, the data content cannot be accessed.

The data 12 can be any form of digital data (text, photographic, scanned, audio, video, etc.) and can be generated through keyboard input 18 by the user 11, or input by the user through attachment of a peripheral device (e.g., disc reader, memory storage device, digital camera, etc.) or downloaded through some form of wired or wireless network connection to either the HCD 13 or the SPED 14.

The SPED 14 can be of a form such as a flash drive token, or a digital media recorder/ receiver or iPod® type device, with integral or replaceable/removable memory, comprised of cryptographic and operational processing hardware capabilities, control and flow logic controls, and interface connections for multiple device attachments.

The SPED 14 is connected to an HCD 13 such as a personal computer, hereinafter referred to as a PC. Other forms of HCDs 13 may be cell phones, video recorders, workstations, or other device configurations which support an input device 18 for input of user commands (e.g., a keyboard or touch screen), some form of display 19 for graphically providing information to the user, a form of digital computer processor for computing on data and interfacing with the input commands supplied by the user, storage memory means for storing data and program instructions, connection port interfaces (e.g., USB, Firewire, ExpressCard™) for connecting with peripherals (e.g., disc storage, printers, scanners) and communications devices (e.g., WLAN, Ethernet, modems), control logic and busses for routing of data and control signals among all the elements of the device and with external peripheral devices sufficient to perform the functions required by the application, and some form of operating system software (e.g., Windows XP®, Windows Mobile®, VISTA®, MAC OS®, Linux®, Symbian®) which provides the process control and sequencing of all instructions, operations, and data flows within the HCD 13 and to all peripheral devices, and supports applications software which can be loaded through digital media (e.g., CD-ROM) or downloaded via the internet or some other network facility.

Externally generated data may be loaded into the HCD via any of the available interfaces of the HCD or, in another embodiment, loaded into the SPED through an external secondary connector integral to the SPED.

Description of Split-Knowledge and the Application of Shamir's Secret-Sharing Algorithm Access to the SPED 14 contents and its operation with an HCD 13 is controlled by authentication of an authorized user 11 and a HCD 13 authorized by the SPED 14 through use of a split-knowledge approach that applies the Shamir secret sharing algorithm, which is well known to those who practice the state-of-the-art in cryptography. System means for implementation of the secret sharing algorithm is comprised of computing method 20, executed by cooperation between host computing device 13 and secure portable encryption device 14, that creates the Master Key Encryption Key that protects the critical cryptographic parameters of the SPED and creates secret authorization shares which protect the contents of the SPED from access by any but authorized users on authorized HCDs. It should be understood that in the case of multiple cryptographic applications, a multiplicity of Application Key Encryption Keys (AKEKs) may be used, with one AKEK being used per application, rather than a single Master Key Encryption Key for the entire device. The following detailed descriptions will apply to a single Master Key Encryption Key or a multiple Application Key Encryption Key.

Secret Sharing

Secret sharing refers to any method for distributing a secret amongst a group of entities, human or inanimate, each of which is allocated a share of the secret. The secret can only be reconstructed when the shares are combined together; individual shares are of no use on their own. Secret sharing schemes were discovered independently by Blakley and Shamir. The motivation for secret sharing is secure key management. There is one secret key, the SPED 14 Master Key Encryption Key (the MKEK), (or potentially one or more Application Key Encryption Keys per application) which provides access to all the secure keys and critical cryptographic attributes held by the SPED 14.

Secret shares are created within the SPED 14 through an initialization process that generates, according to the method of Shamir, a temporary polynomial equation from which the MKEK and the secret shares are derived. The shares are then individually combined and shrouded, through the use of a transform, with external secrets (e.g., PINs, authorization codes) from each of the entities or components comprising the system (e.g., users and apparatus, namely, users 11, the HCDs 13, and the SPED 14). The novelty of storing and using a transform rather than the secret shares themselves prevents collusion of external entities, which have knowledge of their own external secrets, from recovering and reconstituting the MKEK or AKEKs, and allows simpler logistics for changing any individual entity's secret without generating a new polynomial and distributing new shares to all. The external secrets are required inputs for authorization to reconstitute the secret MKEK or an AKEK and access the secured data contents contained by the SPED 14 or the associated HCD 13.

Any group of K or more entities (up to N) can come together to reconstruct the secret MKEK or an AKEK, but no group of less than K entities can accomplish this. Such a system is called a (K,N)-threshold scheme.

A popular technique to implement share reconstitution in polynomial based threshold schemes uses polynomial interpolation ("Lagrange interpolation"). Two points uniquely define a line, three points define a parabola, four define a cubic curve, etc. More generally, n coordinate pairs (xi, yi) uniquely define a polynomial of degree n−1. The SPED 14 processor generates the temporary polynomial equation, encodes the secret (i.e., the SPED Master Key Encryption Key—MKEK or one of the Application Key Encryption Keys) as the curve's y-intercept, and creates shares, each of which represent the coordinates of a point on this curve. When the shares from K entities are reconstituted to re-form the polynomial curve, interpolation can compute the y-intercept that represents the secret MKEK. It is also possible, using a well-known optimization of the Lagrange method, to recover a specific point without recovering the entire polynomial.

This particular method was invented by Adi Shamir in 1979. Shamir's scheme is provably secure, that means: in a (K,N) scheme one can prove that it makes no difference whether an attacker has K−1 valid shares at his disposal or none at all; as long as he has less than K shares, there is no better option than guessing to find out the secret. Given any K shares, the polynomial is uniquely determined and hence the secret MKEK, the "y" intercept, can be computed. However, given (K−1) or fewer shares, the secret cannot be reconstituted.

Shrouding External Secrets

The external secrets cannot be used directly to reconstitute the secret MKEK. The shrouding operation discussed above provides additional security against attacks by ensuring that the secret shares do not remain in static storage within the system and are only reconstituted at their time of use. The shrouding technique provides the additional advantage that a user's PIN or some other external input can easily be changed by un-shrouding with the old value and re-shrouding it with the new value, without have to replace the shared secret or re-deal all of the shares. Because of this approach, neither the share values nor the external secrets are ever stored on the SPED.

This scheme ensures that the shares cannot be recovered, even by a sophisticated attacker who might "peel" the chip and attempt to analyze it with an electron microscope or extremely small probes. The external secrets (e.g., PINs, authorization codes) are the only values known outside the SPED. Assuming that at least N-(K+1) of the external secrets remain secure, the MKEK is mathematically-provably secure, as the scheme does not rely on the usual assumptions of "computational infeasibility" required for most cryptographic operations. So long as K shares are known, the MKEK can be recovered, otherwise all of the data protected by the MKEK will be irretrievably lost.

An external PIN, password, passphrase, or arbitrary string of bits is hashed using SHA-256, and that value "Exclusive OR'ed" (XOR) with its associated secret share value to provide the shrouded share value that is maintained within the SPED. After the shrouding operation is complete, the (un-shrouded) secret shares are securely destroyed by overwriting memory locations in which they were stored.

For this embodiment, K=5 and N=6, and the secret shares, in their shrouded form, are stored within the cryptographic boundary of the cryptographic processing chip on the SPED 14 and never leave the device. The entities with shares include two classes—authorizing and enabling. At least one of the authorizing entities, the security officer PIN or the user PIN, must be present in order to reconstitute the secret MKEK. Enabling shares are bound to at least: 1) the media controller/microprocessor in the SPED 14, 2) the SPED itself through identification of its integral cryptographic processor chip, and 3) a host-computing device. Optional shares may be created and stored within the SPED cryptographic processor for binding with other identified entities. Where a security officer is not involved, the user PIN and the security officer PIN can be set to be equal. External PINs and/or passwords uniquely associated with each of the entities are cryptographically associated with each of these shares as will be discussed further below.

Block Diagram of the System and Its Constituent Parts

Figure 2A:
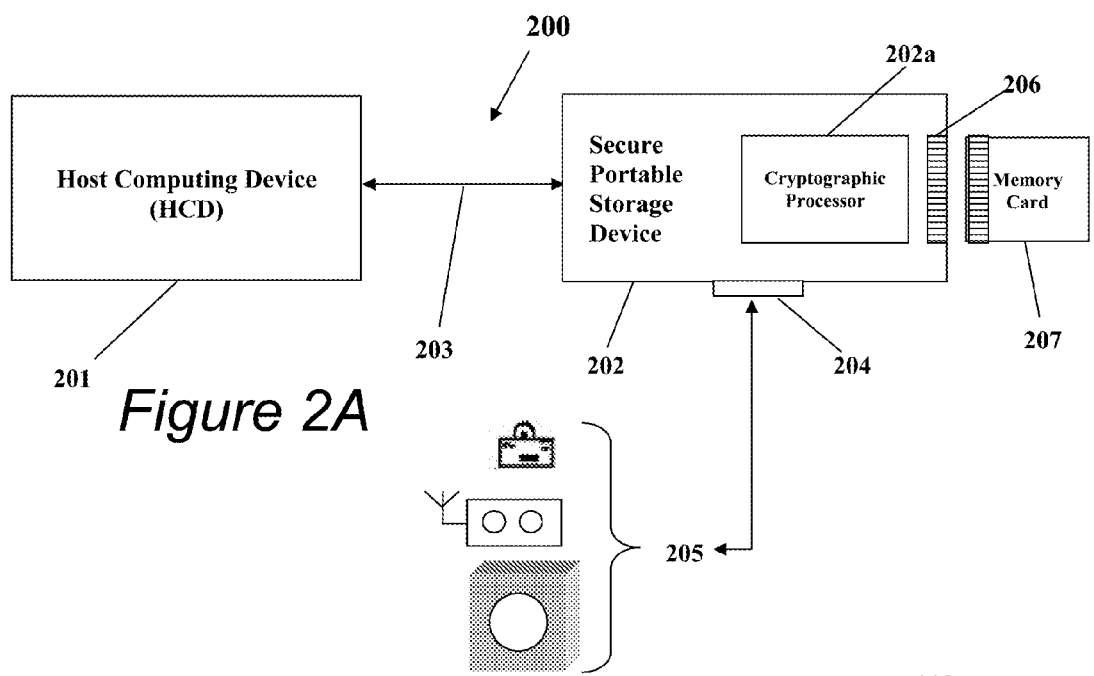
FIG. 2A is a block diagram of a HCD, and one embodiment of an SPED, and biometric authenticator configurations.
Figure 2C:
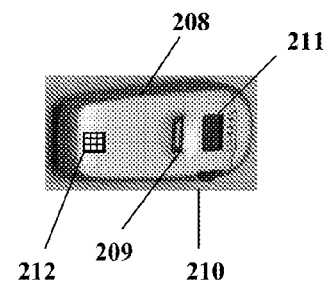
FIG. 2C is a sketch of an SPED in a portable form factor.

FIG. 2A is a block diagram of a system 200. The system 200 includes an HCD 201 and a SPED 202 that communicate via a communications interface 203. The SPED may also optionally contain another communications port interface (204) for connection to other types of peripheral devices 205, such as digital cameras, wireless or wire transceivers, memory devices, etc. The SPED 202 includes at least an integrated cryptographic processor IC chip set 202a that enables cryptographic operations (examples of which are described in more detail below) to be performed on data that is stored within and "looped-back" to the HCD 201, data that is transmitted from the HCD 201 to the SPED 202, data that is transmitted from the SPED 202 to the HCD 201, data that is transmitted from another peripheral device 205 through connection port 204 to the SPED, data that is transmitted from the SPED 202 to another peripheral device 205 through connection port 204. As explained in more detail below, the SPED 202 can obtain its mass memory capacity through integral connection port 206 which interfaces to a mass memory storage module 207 (e.g., a miniSD memory card). Alternatively, for more secure authentication of users in the log on process, the SPED 202 can connect, as shown in FIG. 2C, through connection port 206 to a biometric module 208 (e.g., a module including a fingerprint scanning device 209, a retinal scanning device, or a face print scanning device) with a secure direct entry scrolling thumbwheel or similar device 210, a display window for status information 211, and an internal connector 212 for connection to SPED 202 through connector 206.

Generally, the communications interface 203 can be embodied by any of a variety of communication interfaces, such as a wireless communications, USB, Firewire, Express Card, a serial such as an RS-232 interface, or a parallel interface. Each embodiment of the communications interface 203 includes hardware present in each of the HCD 201 and SPED 202 that operates in accordance with a communications protocol (which can be embodied, for example, by software stored in a memory device and/or firmware that is present in the HCD 201 and SPED 202) appropriate for that type of communications interface, as known to those skilled in the art. Each embodiment of the communications interface 203 also includes mechanisms to enable physical engagement, as appropriate, between the HCD 201 and the SPED 202. Similar embodiments can exist for communications port 204 to connect peripheral modules 205 and the SPED 202.

Generally, the cryptographic processor configuration 202a can be configured to perform any electronic data cryptographic operation (herein, referred to simply as a "cryptographic operation") including, for example, operations that provide one or more of the basic cryptographic functions, such as hashing, encryption/decryption, digital signature, key exchange, verification of data integrity, and user authentication. Particular cryptographic operations that can be implemented in the SPED 202 are described in more detail below.

The cryptographic processor configuration 202a can be, for example, a dedicated cryptographic processor in combination with an FPGA and an ARM microprocessor. Herein, "cryptographic processor" refers to an IC chip set configuration that performs cryptographic operations and that includes one or more mechanisms (such as, for example, use of a hardware random number generator and/or protected memory) to provide security for the content of those operations.

Figure 2B:
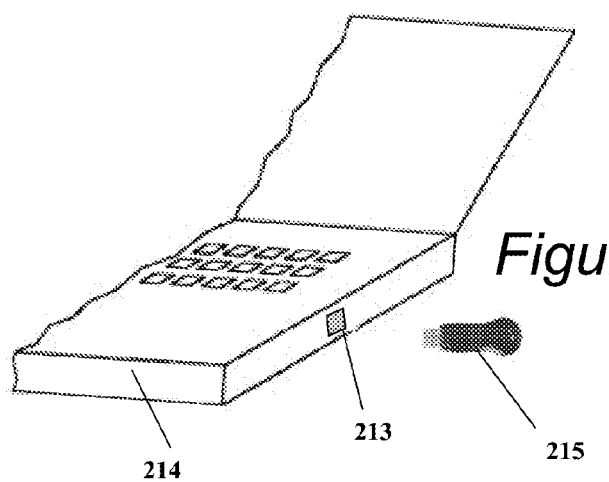
FIG. 2B is a perspective view of one embodiment of an HCD and SPED.

FIG. 2B is a perspective view of a physical implementation of the system 200 of FIG. 2A, according to one embodiment of the invention. In FIG. 2B, the SPED 202 of FIG. 2A is embodied as a flash card memory device form factor 215 that can be inserted into a corresponding USB socket 213 formed in a laptop computer 214 that, in FIG. 3B, embodies the HCD 201 of FIG. 2A.

In another embodiment, various pieces of metadata from the original file, including time and data information, file name, and other data, optionally including metadata specifically added by the user or attached to the file through other mechanisms, including so-called Alternate Data Streams, may be included in final encrypted version of the file. Such data may be carried in the clear, i.e., unencrypted, or it may be encrypted using the same keys used to encrypt the data, or it may be encrypted in yet another key or keys, including the key(s) associated with a central repository or cataloguing service, or in some combination of these keys. The function that performs this cataloging service will be referred to as a Catalog Agent. The Catalog Agent may or may not be the same entity as the Mandatory Recovery Agent described above.

Figure 3A:
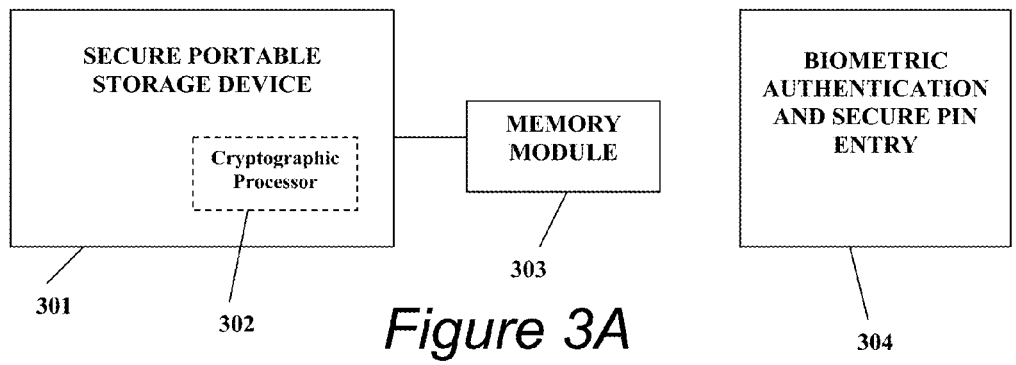
FIG. 3A is a block diagram of the SPED with optional removable memory module and an optional user authentication device comprising a secure PIN entry mechanism and biometric input.

Block Diagram of the System Showing Optional Memory Module and Adjunct Authentication Module FIG. 3A is a block diagram of an SPED 301, according to one embodiment, including an integral cryptographic processor chip set 302, a plug-in replaceable/removable mass storage media 303 (e.g., miniSD memory card), and an optional authentication module 304 that consists of a biometric fingerprint scanner and a mechanism for securely entering an alphanumeric PIN input device, such a thumbwheel, joystick, or touch screen. It is possible, as explained in more detail below, to use the modular SPED 301 with the replaceable/removable mass memory storage module 303 without any connected biometric module 304 or external peripheral device. The SPED 301 and memory module 303 are physically separate devices that can be physically and electrically joined (as described further below) to enable communication between the modules 301 and 303.

Plan View of Physical Implementation

Figure 3B:
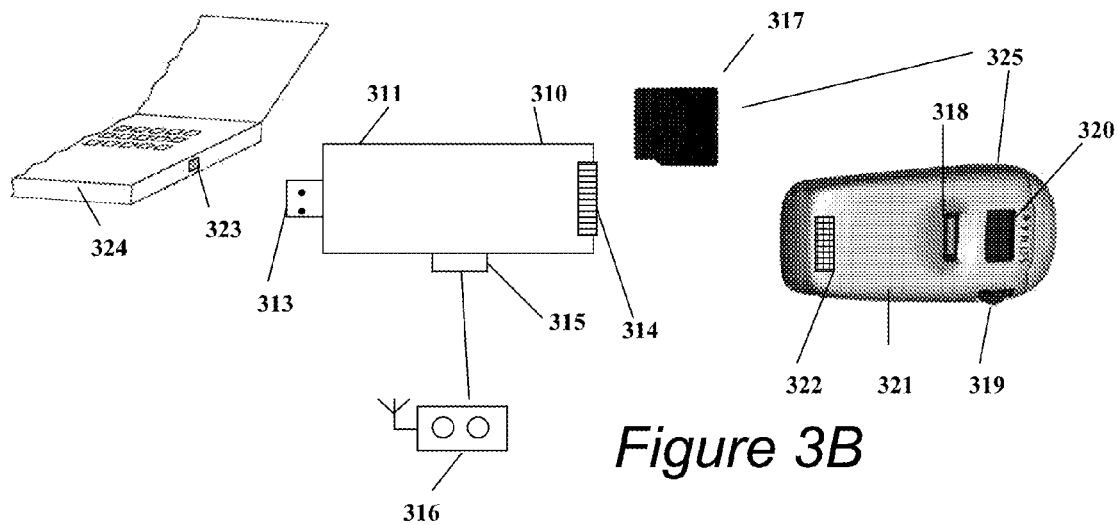
FIG. 3B is a view of a physical implementation of one embodiment of a system incorporating an SPED and HCD.

FIG. 3B is a plan view of a modular SPED 310 that represents a physical implementation, according to one embodiment, of the modular device 301 of FIG. 3A. The SPED 310 includes a first module 311 and can attach to a second module 325 through port connection 314 and can communicate with an attached peripheral 316 (e.g., wireless transceiver) through an additional port connection 315. A connector 313 is formed at one end of SPED 311. Opposite the connector 313 is a connector 314 for attaching a miniSD memory card 317 or other mass memory storage module or peripheral 325 with a compatible connection interface for signaling and data transfers.

For example, in one embodiment, an optional biometric fingerprint scanner 318 and alphanumeric user input device illustrated in FIG. 3 as a scrolling alphanumeric thumbwheel 319 with "push-to-enter" characteristics and display window 320 can be configured as a covering "sleeve" housing 321 to connect to the SPED through connections 314, for the purposes of using a scanned fingerprint and secure user PIN entry for securely authenticating the user to the SPED 310 and HCD 324. The mating connection of this biometric module 312 is constructed to have a compatible connection 322 within the recess of its housing to mechanically and electrically interface to the SPED module 311. The SPED 311 can have a size and shape such that the SPED 311 can be directly inserted into a USB connector socket 323 on the HCD 324, to enable communication between the HCD 324 and the SPED 310. Optionally, another external peripheral apparatus 316, e.g., a digital camera, a wireless transceiver, a memory media, may be directly attached or cabled to the port connection 315 for transferring data to or from the SPED 310.

Initiating Use of the System

Figure 4:
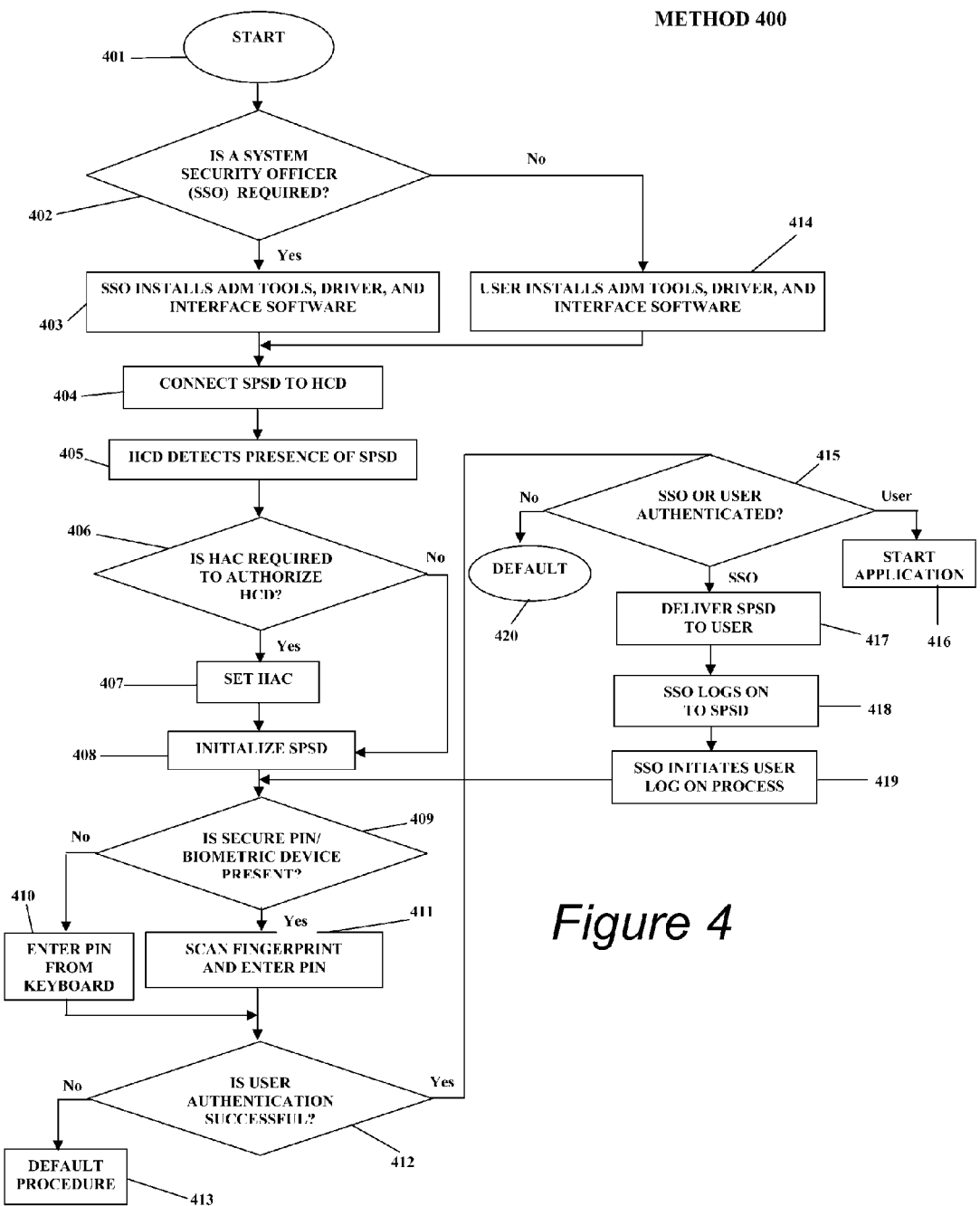
FIG. 4 is a flow chart of a method, according to an embodiment, for installing software to initiate use of an SPED and to authenticate a user or system security officer.

FIG. 4 is a flow chart of a method 400 for initiating use of a system. The system that includes a SPED and a HCD can be implemented according to the method 400 so that policies can be accommodated for first time initialization of the system by a user or by a designated system security officer 402. Either designee proceeds through steps 403 or 414 to load and install software on the HCD to display user procedures to initialize, zeroize, change PIN, and view device properties of the SPED. The designated user inserts the SPED 404 into the connection socket of the HCD and the presence of the SPED is detected 405. The SPED is further configured to optionally recognize a particular recipient HCD through the setting of the Host Authorization Code in steps 406 or 407, and proceed to initialize the SPED 408 in preparation for the user or SSO authentication process as illustrated by steps 409 and 410 or 411, 412, 413, and 415. In the case where the user is the designated installer and initializer of the SPED, if successful authentication has occurred, the user may start the application 416. If the system security officer is the designated SPED installer and initializer, the SPED may be delivered to the user by the security officer who initiates a log on process by which the user can enter their own PIN for processing through steps 417, 418 and 419. The user then proceeds to authenticate himself to the device through steps 409 and 410 or 411, 412, 415, and if successful, starts the application in step 416.

It is to be understood that the method 400 shown in FIG. 4 is not the only way to enable the embodiments of use of an SPED with a HCD as illustrated in FIG. 4. As can be readily appreciated by those skilled in the art, such embodiments can be implemented using any of a variety of other appropriate methods. Further, the installation of software and initialization of a SPED can include embodiments not illustrated in FIG. 4 as in the case of authentication default processes 413 and 420; likewise, such use may not include some of the embodiments illustrated in FIG. 4 because of specific security policies or regulations governing the user's organization. The method 400 of FIG. 4 is shown merely to aid in the illustration of certain embodiments, and should not be interpreted as restricting the manner in which an SPED can be used.

Description of the Host Computing Platform

Figure 5:
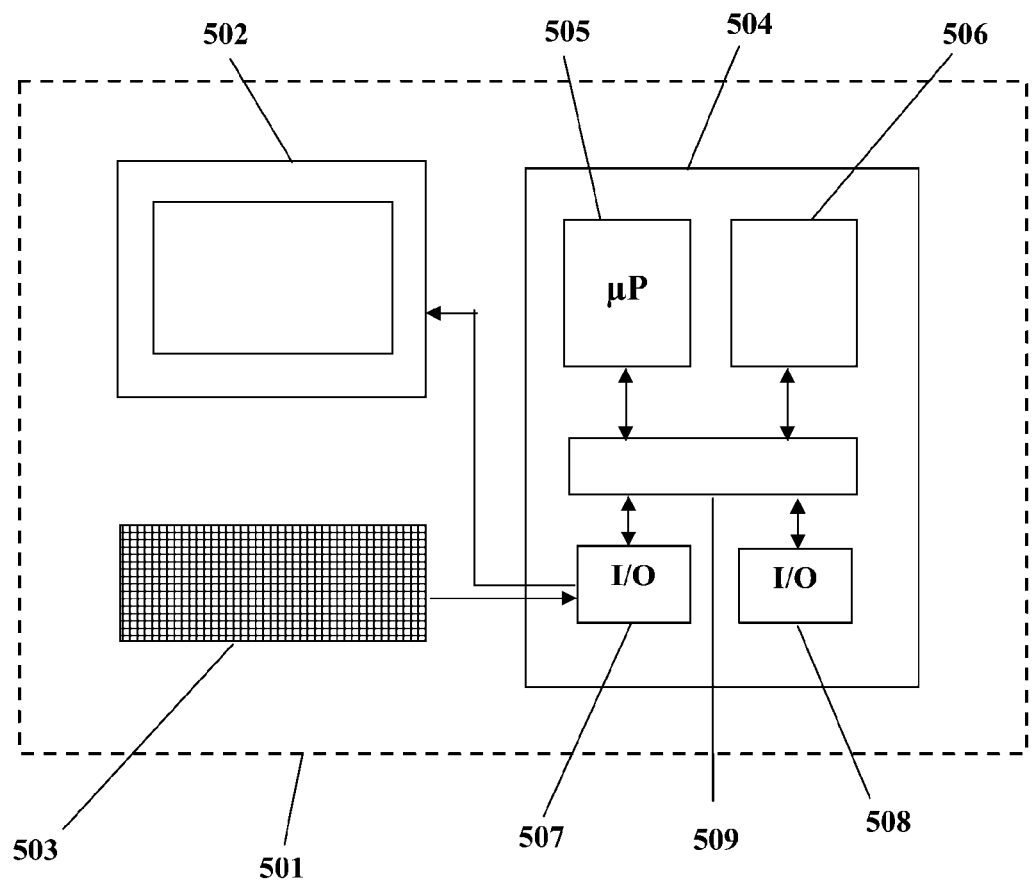
FIG. 5 is a block diagram of an HCD, according to one embodiment of the invention.

FIG. 5 is a block diagram of an HCD 501 according to one embodiment, illustrating operation of the HCD 501 during a method such as the method 400 of FIG. 4. The HCD 501 (e.g., as a desktop PC configuration) comprises a display device 502 (e.g., an LCD display, monitor), and user input device 503 (e.g., a keyboard, touch screen, trackball, joystick or other appropriate device), referred to collectively hereinafter as user interface device 503. The HCD 501 also comprises, mounted within a housing 504, a processing device 505, a memory device 506, an input/output (I/O) device 507 for enabling communication with the user interface device 503, and an input/output (I/O) device 508 for enabling communication with the SPED. The devices 505, 506, 507, and 508 can each be implemented by conventional devices and can communicate with each other via a conventional computer bus 509, as is well known and understood.

Description of the Separate Hardware and Software/Firmware Elements

Figure 6:
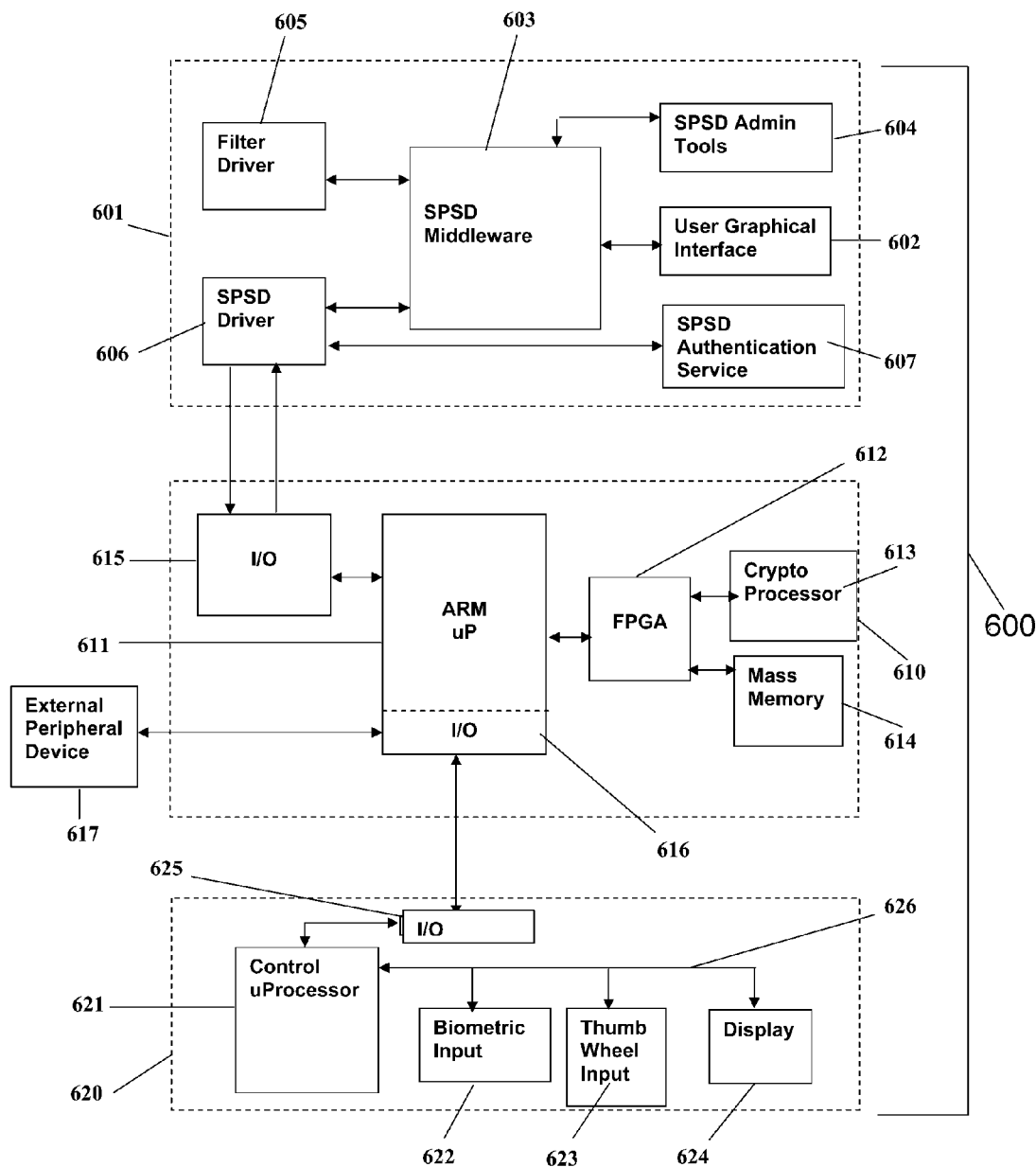
FIG. 6 is a block diagram illustrating one embodiment of the HCD, the SPED, and the optional secure PIN entry/biometric sensor device.

FIG. 6 is a block diagram of system 600, according to one embodiment, comprising the separate hardware and software/firmware components that are used in the cryptographic-processing, authentication, and authorization processes such as the method 400 of FIG. 4. The HCD 601 comprises resident applications software and drivers that interface with the SPED 610 and cooperate to execute the secret sharing algorithm for combining cryptographic shares from the user, the HCD 601, the SPED 610, and, optionally, an administrative security officer, to implement the system means for reconstituting the Master Key Encryption Key of the module SPED 610 as will be described later. The user interface software module 602 is integrated into the operating system file system through a browser shell and interacts with the user by providing the user with appropriate menus and messages. The SPED middleware 603 provides functionality that is used by the user interface to interact with the modular SPED 610. The SPED administrative tool software module 604 provides a user interface for SPED administration that helps the user to initialize, zeroize, change PIN, and view the device properties. The filter driver software module 605 is constructed as a file system mini-filter driver that uses the operating system filter manager component. The USB function driver module 606 presents a Microsoft Windows PCSC interface to the system and the host authorization service module 607 is a service that runs in system space as part of the systems methods that protect the host authorization code and cooperates with the SPED 610 to support the execution of the shared secret algorithm. In other operating systems, similar constructs could be used.

One embodiment of the SPED 610 includes a processor/ controller device 611, an FPGA 612, a cryptographic processing device 613, an attachable/replaceable memory device (e.g., miniSD, miniSDHC, or microSDHC memory card) 614, an input/output (I/O) device 615 for enabling communication with the host computing device 601, an input/output (I/O) facility 616 for enabling communication with an optional biometric fingerprint scanner and secure PIN entry device 620, and to communicate and interface with an optional peripheral device (e.g., a digital camera, an additional memory media, a wireless transceiver) 617. The components 611, 612, 613, 614, 615, 616, and 617 can each be implemented by commercially made devices and can communicate with each other via conventional computer busses as is well known and understood. The processor/controller 611 is a 32-bit ARM processor and is the main controller for all the secure mass storage operations and for most interface data flows performed by the SPED module 610. It acts as the master state controller for the SPED module 610, and implements public key cryptographic and signing processing used during the file encryption and decryption operations. It also implements a hashing operation as part of providing the random numbers required for ephemeral keys and other cryptographic values. The FPGA 612 provides high-speed execution of AES-256 and SHA-384 algorithms (as well as other AES key size and hash size alternatives) to support encrypt-and-seal/decrypt-and-verify operations, as well as providing the interface to the cryptographic processor 613 and the attachable mass memory (e.g., mini-SDHC memory card) storage device 614.

In one embodiment, the cryptographic processing device 613 is implemented in a cryptographic controller that has been programmed for such processes. The secure operation of the SPED 610 uses this processor for user authentication and for secure generation and storage of the static keys used during file encryption and decryption. It also provides an approved high-entropy random bit generator. In this embodiment, it is fabricated with special coating and electrical shield properties and zeroization schemes to protect the chip contents from sophisticated electronic "peeling" or scanning or invasive attacks to retrieve secure contents.

In another embodiment, an optional biometric authentication device comprises a fingerprint scanner and secure PIN entry 620 and serves to provide, during the user log-on process, additional secure levels of authentication through biometric fingerprint scanning to match user templates captured and stored in the processor 621 memory of the 620 during scanner training and initialization procedures. This physical configuration embodiment fits as a sleeve over most of the SPED module 610 and connects through an internal connector 625 that is within the recess of the module and interfaces with the SPED module 610. After the fingerprint scanner is used and the user fingerprint is verified, and secure PIN entry is made through the human input device, and the user is authenticated by the SPED module 610, and the log on process is completed and displayed to the user by the HCD 601, the sleeve may be removed and the removable mass memory device 614 attached. The biometric authentication device 620 includes an integrated control processor 621 with on-chip RAM and flash memory, and a biometric fingerprint swipe or platen sensor 622 used for capturing the fingerprint image that can be processed by the SPED module 610 for template matching and user authentication. The biometric module 620 also comprises a scrollable thumbwheel or other form of human input device 623 for use in direct secure PIN entry by a user. When requested by the SPED module 610, the control processor 621 will use this human input device 623 to collect the PIN and send it directly to the SPED module 610 for user authentication. A display 624 is used for displaying status messages and prompting the user for required inputs. The devices 621, 622, 623, and 624 can each be implemented by conventional devices and can communicate with each other via a conventional computer bus 626, as is well known and understood. The HCD module 601, the SPED module 610, the biometric module 620, and the peripheral device module 617 are shown in simplified form in FIG. 6 to facilitate clarity in illustration of this embodiment, as described in more detail below and as understood by those skilled in the art. The HCD module 601, the SPED module 610, the biometric module 620, and the peripheral device module 617 can—and typically will—include other devices not shown in FIG. 6.

Inter-relationship of the Components

A significant advantage of the system according to the present invention comprising a SPED and a HCD is that the system comprises a set of sequential procedures for system installation and initialization of hardware and software subsystems to configure and integrate physical and logical levels of access authorization for portable memory storage apparatus. The present invention accomplishes this by means of a K out of N split-knowledge technique that combines a mandatory minimum set of: 1) Host Authorization Code (HAC) information that can be specific to a HCD and enables a unique transformed external secret for each HCD, 2) the user's PIN, 3) an optional security officer's PIN, 4) SPED-specific internal identification information, and 5) other unique identifier information that may be optionally required by an organization's security policies and procedures. The system can be implemented to employ these individually created and independent authorization parameters to reconstitute at least "K" shared data values whose total combination is required to reconstitute a Master Key Encryption Key (MKEK) that protects the private keys and the other critical cryptographic parameters stored on the SPED against loss or all forms of attacks.

The system that comprises a HCD and a SPED can, in general, be configured, initialized, and operated in one of two modes depending upon an organization's security policies and procedures: 1) requiring only a single user PIN to install and initialize the system as in the case of a sole proprietorship where the individual selected for the installation and initialization procedures can be the ultimate user of the system, and 2) requiring a second PIN assigned to an administrative system security officer (hereinafter referred to as SSO), as in a government or commercial institution protecting valuable intellectual property or vital national interests. The system can enable a system security officer or other designated security administrator, according to the policies and procedures of an organization, to be the designated person to physically initialize the SPED with the HCD in order to limit the access only to those users, SPEDs, and HCD host computers that have "need to know" access permissions as defined by such policies and procedures. The system can be implemented so that under such a security policy, first the system security officer can create the HAC for each designated HCD, then create an SSO PIN and initialize the SPED, and then can distribute an SPED to the user for the creation of their PIN as in FIG. 4, Method 400, steps 402, 403, and 414.

As discussed further in this Description, there can be delineation between the required authorized actions of a user and an administrator/security officer. Unless otherwise specified, the general term user will apply to both.

Referring to FIG. 6, the system that includes a SPED and a HCD can be implemented so that first time use of the system begins when the user loads (either through media (e.g., CD-ROM, the SPED memory download) or network interconnection) and installs mass storage software 602, 603, 605, 607, into the HCD 601 which includes its own device drivers 605 for the SPED replaceable/removable storage module 614. This software also includes operational and user interfaces 602 for the SPED replaceable/removable storage module 614. When prompted by the appropriate software module, a user of the system connects the modular SPED 610 device to the HCD. Such connection can occur in any manner that enables the SPED to communicate with the HCD. Frequently, this will occur as a result of a physical connection of the modular device to the host-computing device. For example, the SPED can be implemented as a USB flash memory token (e.g., a form factor conforming to a USB connection as established by the appropriate standard), or alternately by an ExpressCard form factor, that is inserted into a corresponding socket formed in the HCD. Alternatively, the SPED can be implemented in a housing from which a connection cord extends, a plug of the cord being inserted into a mating receptacle formed in the HCD. However, such physical connection need not necessarily occur; the SPED can also be connected to the HCD by any type of wireless communication, e.g. Bluetooth or infrared, for which the HCD contains an appropriate interface.

The system that includes a SPED and a HCD can be implemented so that for the first time use of the system, a user can also load and install administrative tools software 604 on the HCD 601 that provides user interfaces and procedures to initialize, zeroize, change PIN and view device properties on the SPED 610 and operate the SPED 610 and HCD 601 systems. In the case of a physical connection, a user inserts the SPED 610 into the connection socket of the HCD 601. Once connection between the SPED 610 and the HCD 601 is made, the HCD 601 detects the presence of the modular device. Such detection of the presence of a peripheral device is typically enabled as a standard embodiment of the software installed into the HCD.

Support for Software-Only and/or Hybrid Decryption and Recovery Mechanisms

All of the hashing, symmetric key encryption/decryption, and public key operations (key establishment and digital signatures) may be performed within the security perimeter of the trusted hardware security device. However, in order to satisfy potential cost constraints for the Recovery Agent capability, another embodiment may comprise a hybrid means whereby a decrypt-only capability could be provided, wherein only the public key operations are implemented within a hardware device, and the hashing and/or symmetric key operations are carried out in software on the host computing device. Yet another embodiment may consist of a purely software implementation of the Recovery Agent decryption capability.

Mathematically Protected Enhanced Authentication Mechanisms and Indicia

In another embodiment, the authentication and authorization methods used within the SPED are sufficiently extensible as to deal with other enhanced authentication devices, methods, and functions, in such a manner as not to necessitate the storing of such enhanced authentication parameters (e.g., biometric indicia, user proximity detection code, permitted operational location information, etc.,) for later comparison in such a manner that such parameters could be extracted and used, under even national laboratory conditions.

Embodiment Using a Host Authorization Code

In a further embodiment, an organization security officer/administrator, or an individual user loads a set of software modules into the host-computing device from a CD-ROM, from a read-only portion of the SPED itself, or from other forms of software distribution media, including wireless communications. The administrator/user determines if the SPED is to function only on one or more designated host computing devices, or with any and all host computing devices. In the case of assigning the SPED to only work with designated host computing devices, the SPED executes, prior to initialization, a series of programs to establish one or more named or default "Host Authorization Codes ("HAC") which can be unique to each host computing device or can be shared among an enclave or Community of Interest of users. In an information system configuration involving multiple Originators, Recipients and host computing devices, an administrator can, personally or by delegation to a trusted representative, cause the same HAC to be set on each HCD or can set multiple HACs on HCDs if the host computing devices are to be shared by different user enclaves or Communities of Interest. In the case of setting up the SPED to work with any host computing device, a default HAC is created and the initialization program creates an individual PIN and generates new sets of cryptographic signature and encryption keys. In the case of security policies of centralized organizations, the administrator can generate a system security officer PIN and each user PIN number to complete the initialization process. Although the HAC used within an enclave may be the same for all the host processors within the enclave, a "diversified" version of the HAC may be created by hashing or encrypting the stored HAC value together with the serial number of SPED device, prior to loading the diversified HAC onto the SPED, in order to ensure that a "wire-sniffing" attack could only compromise the particular diversified value of the HAC used for that particular SPED, and not all such devices.

In another embodiment, the integrated SPED processor mediates the communications between the host computing device (HCD) and the SPED itself, as a result of user interface enabled instructions provided by the host computing device, to allow various options for user authentication and log on, device initialization, optional setting of the host authorization code (HAC), and control of the processing and flow of the encrypted/decrypted data. One security mode encrypts data from the HCD and stores it directly in the SPED memory media for storage or communication with another device. In an alternative mode, data from the HCD is encrypted and returned directly in a "loop-back" mode of operation, without being stored for application usage by the SPED memory, and, in the reverse situation, data from the HCD is sent to the SPED for decryption and then returned. It is important to note that HCD data encrypted by the SPED can only be accessed and decrypted by a user who has the PIN and the SPED device, and an authorized computer, if a host authorization code process has been established.

In a further embodiment, the SPED is activated by the user through the input of a PIN to execute the log on process and gain access to the facilities of the SPED. The PIN is established during an initialization process, which can be executed by an individual user acting as a security administrator. Alternatively, in an organization with a centralized administrator and set of tiered or multi-level security policies, the system security officer can initialize any SPEDs. The user may be allowed to change his or her own PIN/password, or that ability may be blocked by a policy option.

Another benefit of a system that includes a SPED 610 and a HCD 601 is that the system can be implemented so that an optional Host Authorization Code (HAC) can also be set so that the SPED 610 will function only with HCDs 601 set up with the appropriate HAC (i.e. the same HAC that has been set on the SPED 610). This embodiment of the present invention can provide a unique fourth level of authentication, (in addition to the physical possession of the device, the knowledge of a PIN, and the biological sensing of some user's physical characteristic, e.g., a fingerprint), namely identification and authorization of a particular HCD(s) 601 in order for an authorized user to logon and access the information on the SPED 610.

Depending upon the organization's policies, a user or SSO can log on to the HCD and set the Host Authorization Code (HAC) by creating a long, statistically unlikely to guess or discover (in excess of 100 alphanumeric characters; for highest security, the present embodiment permits up to 255 alphanumeric characters) random or pseudo-random code, which can be generated by blind fingering actions on a keyboard, or by creation of a pseudorandom or random code by the SPED cryptographic processor 613, or by an application program that runs on the HCD 601, and whose results can be copied and transferred as the HAC input to the HAC creation program. This input HAC alphanumeric string can be put through a transform (e.g. a one-way hash function) before being maintained on the HCD 601 or being set on the SPED 610. This HAC, in its transformed form if this has been done, is stored in the HCD 601 registry in an encrypted form that is specific to the computer (HCD) on which the SPED 610 will be authorized to operate. This is accomplished by using a unique property of the HCD, such as an internal serial number of the bios chip, processor chip, or other secure readable or calculable method of identification installed by the manufacturer for unique HCD identification and licensing. Access to this encrypted HAC value in the registry is further protected against extraction or copying, by authorization services SPED authorization service 607 software procedures allowing read only access only to designated administrators. Users that do not belong to this group cannot have any access permissions to the registry key or value.

The HAC will also be sent to the SPED 610 to set up this value as the authorization code used for recovering its corresponding share to be used in the K of N derivation of the MKEK. Before setting the HAC value in the SPED 610 it can also be transformed yet again in order to diversify it so that it is unique to the SPED on which it is set, so that a compromise of a HAC for a particular SPED would not compromise the HAC for all SPEDs used with a common HAC through a common enclave or domain, for example. This requires using something unique to the SPED 610 (e.g. the SPED serial number) and combining it with the HAC to perform the transform before sending it to the SPED (e.g. append the SPED serial number to the HAC and then cryptographically hash the combined value). Of course, this same process will be used when the shared secret is first generated and the shares created.

The particular manner in which the HAC shared secret can be set is dependent upon the initial entry of a pseudo-random alphanumeric string and the binding of the creation of the secret to a specific identity of the HCD 601. Using this process the same HAC can be set on more than one HCD 601 allowing a particular SPED 610 (an SPED initialized with this particular HAC) to be used on multiple HCDs. However, if the appropriate HAC has not been set on a particular HCD 601 the SPED 610 in question (the SPED initialized with this HAC) will not be able to be authenticated, therefore blocking its use on that HCD 601.

In addition, when saving the HAC on a particular HCD 601, the HAC can optionally be assigned a common name associated with that particular HAC value. In this way, multiple HACs can be set for a single HCD 601, each only valid for the specific SPEDs that have been initialized with this particular named HAC. Using this feature, a given host can support multiple levels of security classifications, each with it own community of interest as defined by a common named HAC.

To illustrate this mode of operation, the system that includes a SPED and a HCD can be implemented to permit alternative creation of HACs for remotely located HCDs, on which the proper SPED mass storage and administrative tools software have been loaded. For example, in an alternate embodiment of the present invention as illustrated in FIG. 1, multiple remotely located host computing devices are connected to a network 22 in a client-server configuration which also comprises a server 21 An Originator 11 can create a host authorization code on their specific host computing device 13 and secure portable encryption device 14, and share this HAC with other Recipients or users 17 in the same Community of Interest without requiring individual user interaction by the Originator's SPED 14 with each host computing device, by communicating the Originator's created host authorization code by a cryptographically secure mutually authenticated client-server channel connection 22 to a system server 21.

Distribution of the Originator created host authorization code to the host computing devices of the designated members 17 of the enclave or domain transmits the shared HAC through a cryptographically-secure, mutually-authenticated client-server channel connection 22. Since the external host authorization code is transformed by the SPED using a unique identifier from each HCD, the HAC secret can only be correctly reverse transformed by the same HCD and combined with the other shared secrets to reconstitute the MKEK. In this manner, multiple HACs may be created to be distributed to combinations of host computing device according to security policies and the designation of Communities of Interest.

In one further embodiment of the present invention, a given SPED 610 can only support a single HAC and therefore a single, optionally named classification level. At the time of SPED 610 initialization, the name of the HAC 601 specified for operating with a given SPED 610 is carried as a public object in the SPED 610 cryptographic processor 613 and is accessed by the HCD middleware 603 after insertion of the SPED, and the matching HAC in the HCD 610 list of HACs will be loaded into the SPED 615 in order to enable a user to log on from the particular authenticated HCD.

User Authentication after the HAC Has Been Set

A further embodiment of a system is that once the HAC has been set, the user continues with the process of initialization of the SPED 610. Before use of the secure data processing applications of the SPED 610 for the first time, the SPED 610 must be initialized to generate keys and set the user Personal Identification Number (PIN). Preferably, a minimum length of at least seven alphanumeric characters for the PIN is entered via keyboard input. Optionally, the SPED device can be configured to require an even longer PIN, and/or imposed various complexity requirements such as the number or upper and lower case characters, numbers, and/or special characters. The system according to the present invention can require PIN entry either from a keyboard input associated with the HCD 601, or from a secure PIN entry device 623 integrated with a biometric (e.g. fingerprint) scanner 622 as dictated by security policies for user authentication.

The SPED can identify, through the HCD microprocessor 611 operating system software, the presence of a secure PIN entry/biometric verifier device 620. In one embodiment, in the event that biometric identification fails, then PIN entry is blocked. If biometric authentication is successful, and incorrect PINs are used to try to access the SPED 610, either as a result of forgetting the PIN or an attack, the time between successive tries can be doubled each time to further increase the difficulty of attack, particularly if the device is left unattended and attached to a host computer. After ten tries, a counter in the SPED cryptographic processor can signal the logic in the SPED to become blocked to prevent a further brute force attack to gain access. The threshold count can send a logic signal to cryptographic processor 613 and encryption keys can be deleted and the PINs completely reset.

A SPED can be implemented so that when the PIN entry process is complete and approved, the initialization process continues with the generation of static keys for file encryption, of public/private signature key pairs with private keys stored in cryptographic processor 613, of key encryption keys for wrapping and protecting file encryption keys, and generation of an AES-256 Master Key Encryption Key for encrypted protection of the entire contents of all keys and critical cryptographic parameters stored within the SPED cryptographic processor 613.

When the Master Key Encryption Key (or an individual Application key Encryption Key) is generated during initialization, "N" secret shares associated with that key are created by the cryptographic processor 613. This embodiment of the secret sharing algorithm incorporated by the invention, namely that a minimum set of K out of N shares must be combined to reconstitute the Master Key Encryption Key (or the specific Application Key Encryption Key for the application that is being selected) at log on, and that the HAC, user PIN, and SPED 610 data must be within the K set, makes the SPED 610 information storage contents provably secure against access and cryptographic attacks unless all these codes are available. Without the proper HAC, it is mathematically impossible for anyone to be able to log on to the device and access or decrypt the data contents, even if the user PIN is known.

When PIN creation is complete, the SPED is ready for log on and all cryptographic processing operations.

Detection and Use of the SPED and Any Mass Memory or Peripheral Device

The SPED may be equipped with a non-volatile memory storage device, such as a miniSD or microSD memory card, available in various sizes up to multiple gigabytes in a very compact form-factor. The memory can be hard-wired and non-removable, but preferably is removable and replaceable via a built-in memory chip socket.

In another embodiment the SPED takes the form of the SPYRUS Hydra Privacy Card® Series II (Hydra PC™) using either the USB interface or the ExpressCard™ interface that is intended to be plugged into a socket within the host computer device housing. This embodiment is of the type of form factor generally used in "flash memory" drive products. An alternate embodiment would include the ExpressCard™ form factor, using an adapter cable with appropriate voltage-reducing circuitry to connect the ExpressCard™ to a USB connector on the host device. Other alternate embodiments of the SPED can be of the form of a handheld multimedia communications device such as a cell phone, smartphone, MP3 player, video player wherein the host computing device can be a local user desktop or laptop computer, or a remote media distribution facility interconnected by wireline or wireless communications over the Internet.

When the user PIN is created, connection between the SPED 610 and the HCD 601 is made, and the user logs on to the SPED through one of the PIN/biometric methods previously described, the host computing device 610 detects and identifies the presence of the SPED in the manner of plug-and-play protocols as is known in the state of the art. The SPED detects the presence and identity of the associated non-volatile mass memory storage module 614 and any peripheral device 617 that is connected to the secondary I/O connection port 616. Such detection of the presence of an attached peripheral device 617 is typically enabled as a standard embodiment of the operating system software of the SPED processor 611.

Typically, once the presence of an attached peripheral device 617 is detected by the operating system software of the SPED 610, the operating system software (or companion software program) also identifies the type of the peripheral device (e.g., digital camera, wireless transceiver, disk memory module). This can be accomplished, for example, by a standard software device driver (hereinafter, "SPED driver") for peripheral devices 617 of the type that use the SPED secondary I/O connection port 616. In FIG. 6, the SPED driver is stored in the RAM memory 611a of the SPED processor 611. It is to be understood that the examples given above are merely illustrative, not exhaustive, of the ways in which a peripheral device 617 can be used. Many more possibilities exist.

Though, as shown in FIG. 6, the SPED includes cryptographic processing functionality, and also provides connection to peripheral device functionality 617, the system 600 can be operated so that only the cryptographic processing functionality is used.

The SPED device driver and HCD interface, administrative, and middleware software can have been previously installed to the RAM memory of the host computing device via an appropriate interface (such as a CD-ROM drive or network connection), as previously discussed for first use installation and initialization, at the time when the user first initiated interaction between the host computing device and the SPED. Additionally, when a SPED device is used with a host computing device which utilizes operating system software that supports the feature informally referred to as plug and play, the SPED related software can be stored in non-volatile storage memory 614 of the SPED or, as available, in the SPED 611a microprocessor memory configuration. Thus, when the SPED is connected for the first time to a particular host computing device, the host computing device can automatically provide the user with the opportunity to instruct the host computing device to cause the SPED interface, middleware and device driver software to be transferred from the SPED memory to the host computing device.

Modes of Operational Use

Figure 7:
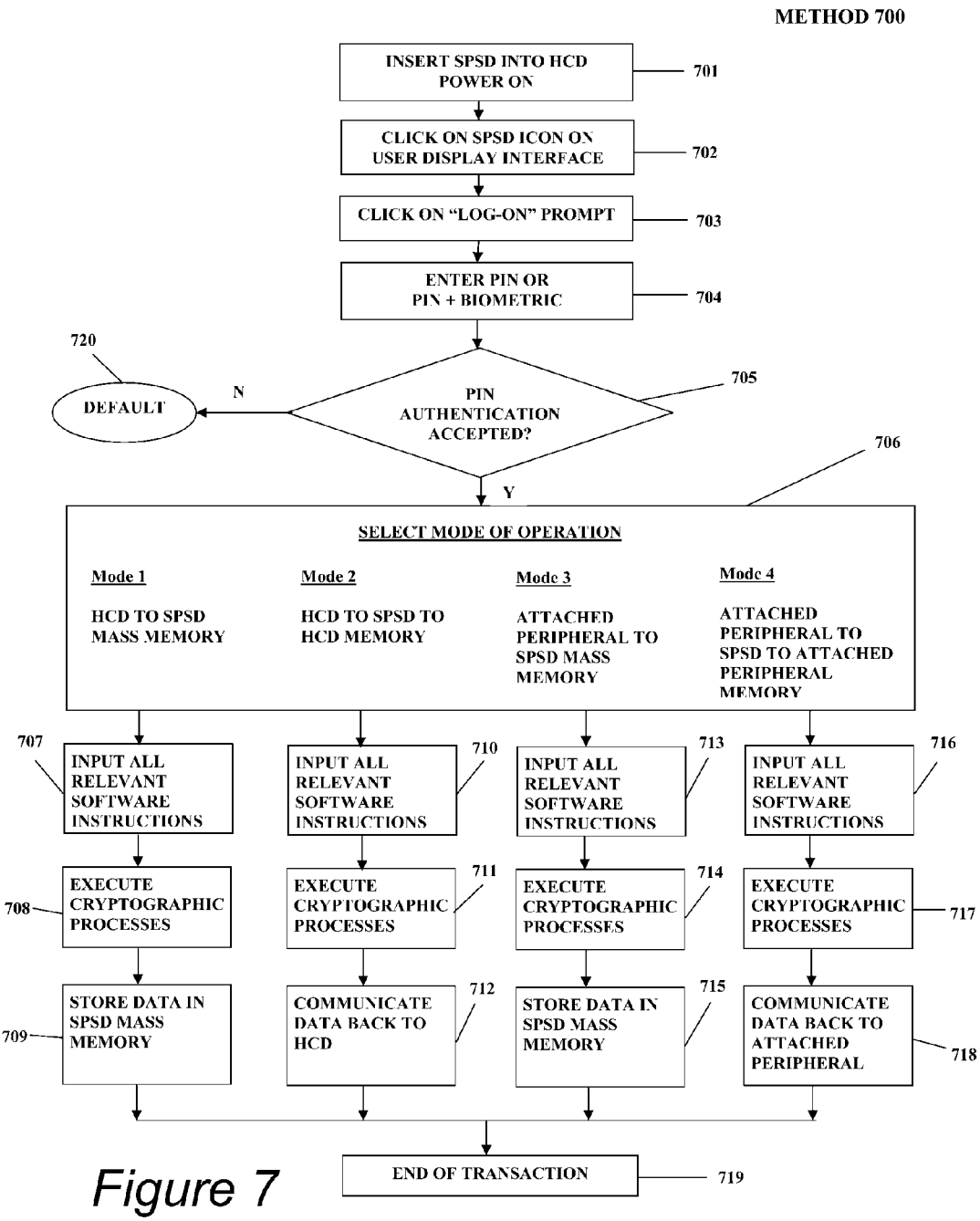
FIG. 7 is a flow chart of a method, according to one embodiment of the invention, for selecting among the different modes of operation of a system according to one embodiment of the invention.

FIG. 7 is a flow chart of a method 700, according to an embodiment, for using an SPED. Once user authentication has been acknowledged and approved, the user can begin using the SPED (in particular, the cryptographic processing functionality of the SPED), as shown by steps 701, 702, 703, 704, and 705 of the method 700. Such use can be enabled by software programs that are cooperatively executed by the host computing device and the SPED.

It is to be understood that the method 700 shown in FIG. 7 is not the only way to enable the embodiments of use of an SPED that are illustrated in FIG. 7; as can be readily appreciated by those skilled in the art, such embodiments can be implemented using any of a variety of other appropriate methods. Further, the use of a SPED can include embodiments not illustrated in FIG. 7; likewise, such use may not include some of the embodiments illustrated in FIG. 7. The method 700 of FIG. 7 is shown merely to aid in the illustration of certain embodiments, and should not be interpreted as restricting the manner in which an SPED, can be used.

A SPED can, in general, be operated in one of four modes: 1) a mode in which the cryptographic processing functionality is used on data created by the HCD and is stored in the SPED mass memory module 614 for physical transport or subsequent electronic communication, 2) a mode in which the cryptographic processing functionality is used on data created by the HCD and is looped back to the HCD for storage in an HCD integral or attached memory storage module or for communication to a server or remote storage device, 3) a mode in which the cryptographic processing functionality is used on data communicated by the attached peripheral device 617 and is stored in the SPED mass memory module 614 for physical transport or subsequent electronic communication, and 4) a mode in which the cryptographic processing functionality is used on data communicated by the attached peripheral device 617 and is looped back to the attached peripheral device 617 for storage in the peripheral device integral or attached memory storage module.

Upon receipt of an acceptable user authentication input, the SPED signals the host computing device to present a user interface that enables the user to effect desired control of the SPED, and, in particular, to use the SPED to perform cryptographic operations, as described below. The user interface for enabling a user to operate the SPED can be implemented in any of a variety of well-known ways (e.g., as a graphical user interface) using methods and apparatus that are well known to those skilled in the art. Generally, the user interface enables the user to perform any functionality that is provided by the SPED as described in more detail elsewhere herein.

As indicated above, a SPED can be operated in any of four modes. Once an acceptable user authentication has been approved, the peripheral device driver can enable the user to select one of the four modes, as shown in step 706 of the method 700. The HCD user interface software and the underlying middleware, drivers, applications, and interface software enables the user to input all desired or required instructions regarding the cryptographic data processing operations to be performed for a particular "transaction" (e.g., encryption of a file from the HCD for storage in the mass memory module 614, the transmission of encrypted data by an attached peripheral communications device, or a loop back of data encrypted for storage in the HCD) as shown by steps 710, 711, and 712 of the method 700. For example, again referring to FIG. 6, the user interface software module 602 can enable the user to select on which data cryptographic operations are to be performed, specify the application of particular cryptographic operation to that data, and specify parameters or other information required for a particular cryptographic operation.

For example, if the cryptographic functionality is embodied as encryption of files and folders from the HCD 601 for storage on the mass memory 614 of the SPED 610, the file or folder icon is highlighted and selected on the HCD displayed graphical user interface, and, for example on a Microsoft Windows system, a drop-down menu lists "Encrypt to SPED" as a prompt for clicking on the item to execute the action and implement the data transfer through modules 605, 606, and 615, and to effect cryptographic processing actions via the appropriate cryptographic resources available from the appropriate SPED cryptographic processing modules 611, 612, and 613. If more than one SPED is inserted into the HCD when files or folders are encrypted, the HCD software 603 and 606 will prompt the user to select the destination SPED. The file or folder name stays unchanged and a new file extension is added to indicate that the file is encrypted.

Once the user has provided instructions in steps 706 and 707 or 710 or 713 or 714, the particular cryptographic processing transaction is executed, as shown by step 708 or 711 or 714 or 717 of the method 700. After execution of the cryptographic processing transaction, the data is transferred to the appropriate destination via step 709 or 712 or 715 or 718. Eventually, use of the SPED ends, as shown by step 719 of the method 700.

Use of the SPED for General Cryptographic Processing, Including PKI Functions

The cryptographic processing functionality of a SPED can be configured to perform any cryptographic operation, as well as other, related mathematical operations. A configuration of the cryptographic processing functionality that enables a particular cryptographic or mathematical operation can be produced, for example, by using appropriate existing cryptographic software, application-specific hardware, or combination of the two, as known by those skilled in the art of producing cryptographic devices.

In particular, the SPED can be configured such that the functionality of the Crypto Processor (613) serves in a manner similar to a conventional smart card or USB token for carrying out a wide variety of cryptographic and PKI functions, including both legacy (RSA, DSA, triple-DES, SHA-1) and advanced (EC Diffie-Hellman, ECMQV, ECDSA, AES, and SHA-2) algorithms in combination with HCD application and/or operating system software. Examples of such processing include hardware-based public key operations carried out within the SPED, with symmetric key and hashing functions carried out in software on the HCD, for applications such as smart card logon, IPSEC link encryption, SSL/TLS encryption and mutual authentication to web servers, secure and authenticated e-mail (S/MIME), pre-boot authentication for Full Disk Encryption solutions, WiFi link encryption, and other similar cryptographic protocols and purposes known to those skilled in the art.

Following is a description of exemplary cryptographic and mathematical operations that can be implemented as part of the cryptographic processing functionality of a SPED. These cryptographic and mathematical operations are well known and can readily be implemented in a SPED by a person of skill in the art of cryptography.

For example, a SPED can implement one or more cryptographic key exchange operations. Any key exchange operation can be implemented, such as, for example, the ECDH, the ECMQV, the RSA, and the X9.42 (ANSI Banking Standard) key exchange algorithms.

A SPED can also implement one or more hash operations. Any hash operation can be implemented, such as, for example, the SHA-224/256/384/512, SHA-1, and the Message Digest 5 (MD5) algorithms.

A SPED can also implement one or more digital signature operations. Any digital signature operation can be implemented, such as, for example, the ECDSA Digital Signature Algorithm, and the RSA Signature (1024, 2048) algorithms.

A SPED can also implement one or more key wrapping operations for both symmetric and asymmetric keys. A key wrapping operation can ensure that plaintext keys are not accessible external to the portable device. Any key wrapping operation can be implemented.

A SPED can also implement one or more symmetric encryption operations. Any symmetric encryption operation can be implemented, such as, for example, the AES-128/192/

256 with ECB, CBC, CTR, and key wrap modes, and the DES (including 3DES, EDE3, CBC and ECB).

A SPED can also implement one or more asymmetric (public key) encryption operations. While asymmetric encryption operations underlie the key exchange operations described above, asymmetric key operations can also be used independently in a SPED for bulk encryption. Any asymmetric encryption operation can be implemented, such as, for example, the RSA, Diffie-Hellman, and Elliptic Curve Diffie-Hellman algorithms, and various variants thereof.

A SPED can also implement one or more exponentiation operations, which are required in many cryptographic operations. Any exponentiation operation can be implemented. Since exponentiation requires a significant amount of processing time relative to other mathematical operations, it can be desirable to implement an exponentiation operation in dedicated hardware. In one embodiment of a SPED, the cryptographic processing functionality of the portable device includes a full exponentiator implemented in hardware.

A SPED can also implement one or more random number generations, which are required in many cryptographic operations. Since high quality random number generation is required for robust, strong key generation and other critical cryptographic functions, and requires a significant amount of processing time relative to other mathematical operations, it is desirable to implement random number generation with approved algorithms in dedicated hardware. Cryptographic processing functionality of the portable device includes a full random number generator implemented in hardware.

Provision for a Multiplicity of Mandatory and Optional Recipients of the Encrypted Data In another principle embodiment of the present invention, the files or records to be encrypted, digitally signed, and/or sealed may include a multiplicity of file header information sufficient to allow multiple Recipients (optionally including the Originator) to be able to decrypt and verify the information that has been so protected, whether that data has been recorded on the storage medium contained within the Secure Portable Encryption device itself, on an integral or ancillary encryption device connected to the host computing device, or some other encryption device that is logically accessible to the Host Computer Device or the Secure Portable Encryption device.

A means of designating a number (zero or more) of Mandatory Recovery Agents or Recipients of the secured information that cannot be bypassed by the normal originator may be provided on behalf of the institution under the control of the System Administrator or System Security Officer on a per HCD basis; together with some other number (zero or more) Optional Recipients specified by the originator, that are required or allowed to be able to decrypt the encrypted information. This set of Mandatory and Optional Recipients is not necessarily limited to a single enclave as defined by a single common named or default Host Authorization Code (HAC), but instead can confine communications between and among a fixed set of users operating in different enclaves, while preventing users from accessing or decrypting the information outside of their own authorized enclave, even if they possess the secure portable encryption device and know the user PIN. This invention dynamically defines and configures the authorized population and tiers of users, portable encryption devices, and host computing devices that are allowed to communicate through the flexibility of support of multiple Host Authorization Codes by each host-computing device.

Use of Public Keys and Credentials

In another embodiment of the present invention, the credential(s) of the Recipient(s) may be provided to the Secure Portable Encryption device (SPED) in the form of a raw public key, for example suitable for use in the EC Diffie-Hellman or ECMQV key establishment scheme, through some trusted out of band process. Alternatively, the Recipient's credentials may be embedded in a conventional X.509 digital certificate, which has been digitally signed by a trusted Certification Authority or chain of Certification Authorities acceptable to the Originator.

In another embodiment, the user's credentials in the form of one or more X.509 certificates, including a certificate and certificate chain that has been signed using the legacy public key algorithms (e.g., RSA or DSA) and legacy hash functions (MD5 or SHA-1), together with the user's SPED ECC encryption and digital signature public keys, may be bound together in either a proprietary format or an X.509 attribute certificate, and signed using the user's/SPED high-strength ECC digital signature key. Such an approach would allow the user's legacy credentials to be validated using the existing (typically RSA-based) certificate infrastructure and revocation checking mechanisms, while still making use of the much higher-strength ECC keys for long-term transactions.

Data Recovery Through Strong but Brittle Cryptography

In another embodiment of the present invention, the various Mandatory or Optional Recipients may be differentiated and selected by the guaranteed longevity of the secrecy of the private keys held by those Recipients, e.g., an Historical Recovery Agent. It is envisioned that the private keys associated with such a Historical Recovery Agent would be split into independent shares using a secret-sharing algorithm, and those shares entrusted to a large number of universities, public libraries, museums, government archives, religious organizations, and other stable and long-lived institutions, such that many but not necessarily all of those institutions working in concert, e.g., perhaps 70 out of 100, would be able to reconstitute the private key. The public key associated with the Historical Recovery Agent could be included within an X.509 or other form of public key certificate, with the expiry period being plainly indicated in the certificate itself. Those institutions could then gather in a conclave perhaps once per decade, reconstitute the private key that was destined to expire on that date, and publish it to the world. As a result, documents that had been securely encrypted for the last 10, 20, 50, or even 100 years would instantly become readily accessible to future generations.

Containment of Encrypted Data to Authorized Users within a Named Community-of-Interest By Means of a Network Access Code Another embodiment of the means for securely protecting decryption is to utilize a Network Access Code ("NAC") as part of a shrouding operation on file encryption keys. In this embodiment, means are provided to optionally restrict the decryption of encrypted information flowing to or from (a) the HCD via the SPED, and (b) one or more other (remote) authorized user(s); unless both the Originator of the encrypted communication and all of the Recipients of said encrypted communication share a common pre-shared NAC or key, which is associated with the creation of a named Community of Interest of authorized members in such a way that if both the Originator and a particular Recipient do not both know the Network Authorization Code the Recipient will not be able to decrypt the information, even if the Originator has knowledge of and trusts the Recipient's public key.

This Network Authorization Code may be stored on the user's SPED, or alternatively on the HCD or some external device or server, or even split between and among the SPED, the HCD, and some user-provided information using a secret-sharing algorithm (for example, as described above), and may be used as part of an overall data containment enforcement mechanism to ensure that information is not communicated, either physically or logically (e.g., via a communications network) to unauthorized users, even on a cross-domain basis. The NAC can be used to enforce data containment to within a group or domain of authorized users, by requiring the Originator and all of the various Recipients know or share a common NAC for that domain.

Means are further provided to securely generate, distribute, store and access, use, and recover the NAC throughout the Community of Interest. Various means, including encrypting the NAC in the public key of the authorized user's SPED device, can be used to distribute the NAC securely, such that it can be stored on the SPED device itself, on the host processor that is used, or on some external device such as a server, so that it can be retrieved and used. Optionally, similar means can be used to distribute the named NAC for a given Community of Interest to one or more Community-Of-Interest Recovery Agents, so that it can be reconstituted in the event of the loss or destruction of the SPED or even the death or disability of the user.

As will be understood by those skilled in the art, the management of possession of this NAC could take a multiplicity of forms, ranging from a simple out-of band communication of the password or passphrase used to generate the NAC; up to a complex, world-wide network of Community of Interest Registrars and Recovery Agents responsible for authenticating the identities, clearance levels, and bona fides with respect to membership in the Community of Interest.

The NAC is exclusive-ORed (XORed) or otherwise combined (e.g., by the use of encryption or some other invertable transform) with the File Encryption Key used to encrypt the file or message, to create what may be called a Shrouded File Encryption Key (SFEK). This SFEK can then be encrypted in the normal manner with a Key Encrypting Key that is derived from the EC Diffie-Hellman or other key exchange mechanism through a standard key derivation process as described in the literature. As will be appreciated by those skilled in the art, this process makes it impossible to decrypt the File Encryption Key, and therefore the file itself, unless the EC Diffie-Hellman key exchange operation takes place successfully, and the NAC is known.

Details of the Cryptographic Key Exchange Mechanisms

Figure 8:
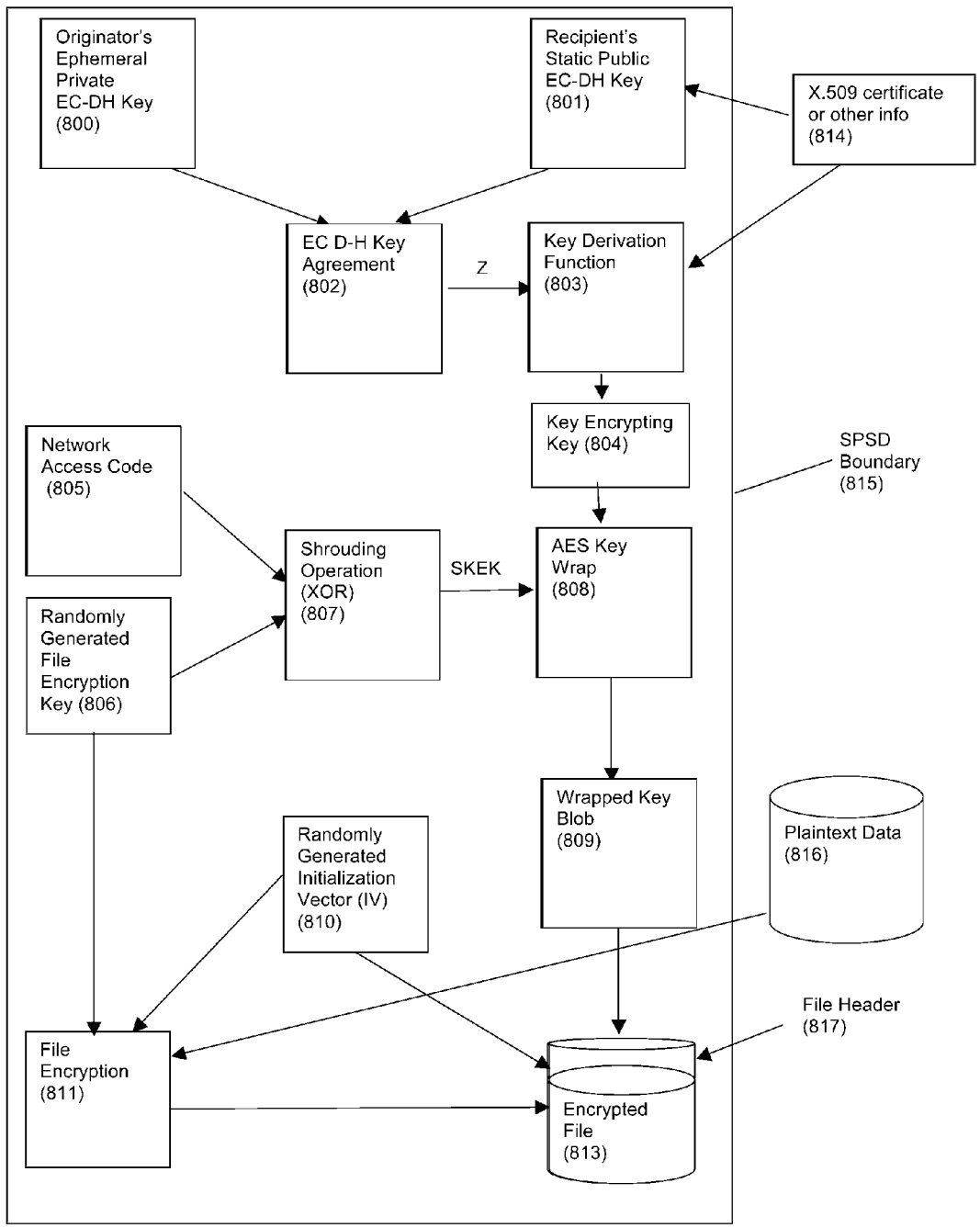
FIG. 8 is a flow chart of one embodiment of key management within an SPED.

FIG. 8 is a flow diagram that illustrates one embodiment of how key management is performed within the SPED 811 when a NAC is used. For every file that is to be encrypted, a new ephemeral public/private ECC key is generated for the Originator 800. The public ephemeral key that is generated at the same time (not shown) is saved for inclusion in the File Header 817 of the Encrypted File 813. The SPED receives the Recipient's static public key 801 from an external source, which may be an X.509 public key certificate or similar construct 804. The Elliptic Curve Diffie-Hellman operation 802 is carried out in the conventional manner, by multiplying the Originator's private ephemeral key times the Recipient's static public key in the ECC field. The output of that function is a shared secret, conventionally called Z, that is passed to a Key Derivation Function (KDF) 803 such as the Concatenation Key Derivation Function defined within SP 800-56A. Other supplementary public and/or private information 804 may be passed in to the KDF as well, in order to bind the key that is generated to the identity of the parties. The output of the KDF is a Key Encrypting Key (KEK) 804.

Independent of the EC D-H key agreement, a random generated symmetric File Encryption Key (FEK) 806 is generated for the file, along with a randomly generated Initialization Vector (IV) 810. In addition, the NAC 805 is retrieved from secure storage within the SPED, and both the NAC and the FEK are passed to the shrouding operation 807, which may simply exclusive-OR the two values together, or alternatively might encrypt the FEK using the NAC as a key.

In either case, the output of that operation is a Shrouded Key Encryption Key, which is input as data to the AES Key Wrap operation 808 and wrapped with the Key Encryption Key (KEK) 804 that was previously computed by the KDF.

The output of the AES Key Wrap operation is a Wrapped Key Blob 809, which is then written to the File Header 817 of the encrypted file 813. Also included in the File Header is the Originator's ephemeral public key (not shown) that was generated at the same time as, and corresponds to, the Originator's ephemeral private key 800, as well as the Initialization Vector (IV) 810.

The symmetric File Encryption Key 806 together with the Initialization Vector (810) is then used to encrypt the plaintext data 816 using the conventional Cipher Block Chaining mode of operation, or alternatively a mode such as Galois Counter Mode, to create the final Encrypted File 813.

The operation of this process during the decryption step is almost identical, except that the role of the Originator's ephemeral private key and the Recipient's public key are reversed. In other words, the Recipient uses his or her static private key instead of the Originator's private ephemeral key 800, and uses the ephemeral public key obtained from the File Header instead of the Recipient's public key 801. Otherwise, the operation proceeds exactly as for the encryption step, except that the File Encryption step 811 is replaced by a decryption operation.

Mitigation of Quantum Computing Attacks

An additional benefit of the NAC would apply in the event quantum computing ever becomes practical. Although it is hypothesized that some day it might be possible to use quantum computing as a tool to "break" an RSA, ECC, or other public key algorithm that might be used to encrypt the Shrouded File Encryption Key, breaking that algorithm would do the attacker no good at all without the knowledge of the Network Authorization Code. Assuming the NAC is XORed with the File Encryption Key, and that the NAC itself is distributed by a secure, out-of-band process, i.e., it is not itself encrypted in a public key system, then there are no mathematical or cryptographic processes that could be attacked using quantum computing other than a brute force exhaustive search attack against a 256-bit key.

Separation of Function between Trusted Third Party Recovery Agents

In yet another embodiment, means are provided for surviving the loss, theft, destruction, or eventual failure or obsolescence of a SPED by recovering, at a trusted third-party File Recovery Agent, the file encryption keys used to encrypt a multiplicity of files and then securely re-encrypting the individual file encryption keys associated with the data (but not the data itself) using a new encryption key or set of keys installed in a newer or replacement SPED, all the while guaranteeing that the Recovery Agent cannot access or decrypt the contents of the file without knowing the NAC that was used when the file was originally encrypted.

In yet another embodiment, means are provided for surviving the loss, theft, destruction, or eventual failure or obsolescence of a SPED by recovering the Network Access Code or NAC, though the use of a Community-of-Interest Recovery Agent (CRA), that would receive and store the encrypted NAC used within a Community of Interest, and could upon an authenticated demand, export that NAC to an authorized user's SPED device, but without ever having access to the private key or keys of any of the authorized users SPED devices, and hence without the ability to decrypt the data itself.

Generating, distributing, storing, and using the Network Authorization Code

It will be understood by those skilled in the art that there are a multiplicity of means methods that could be used to securely generate, distribute, store, and make use of the Network Access Code.

In one instantiation, which might be well-suited for casual use by friends and family or social networks, the NAC could be entered by the Originator during the encryption process (and by the Recipient(s) during any decryption), in the form of a passphrase that would be entered via the keyboard attached to the HCD, with the passphrase being passed to the SPED by the host software and hashed within the SPED to form the NAC before it is used.

The NAC can be given a unique name, and centrally managed by a Community of Interest manager or authority. For example, a community of interest of automobile parts manufacturers might be established by Chrysler, so that those vendors could communicate with Chrysler, but Ford would not be able to originate or decrypt messages to that COI. Likewise, Ford could set up their own COI, and Chrysler would not be able to participate, but those vendors that sold to both Chrysler and Ford would be able to communicate with both, but separately.

The NAC would be randomly generated using a random number generator in an SPED, and then encrypted in the ECC public key of the authorized user, using a conventional EC Diffie-Hellman and Key Derivation Function to encrypt the wrapped NAC. Once created, the named wrapped NAC could be sent to an authorized user in any convenient manner, including e-mail, FTP, etc. Upon receipt by a user, the named NAC could be stored on the SPED token itself or it could be stored on the HCD for retrieval as needed. The NAC would be decrypted by the SPED prior to use.

An additional embodiment recognizes that in order to recover a file or other information at some distant point in time, it will be necessary to recover the NAC as well as being able to decrypt the Shrouded File Encryption Key. Because databases of keys, NACs and other such information might become disassociated from the message or otherwise rendered inaccessible, it is highly desirable that the encrypted NAC information be carried in the encrypted file or message itself. For that reason, preferably the NAC will be encrypted in the public key of the authorized user, and in the public key or keys of one or more Community of Interest Recovery Agents (CRA). In this embodiment, the NAC would be encrypted only once per user, but the encrypted form would include the wrapped version of the NAC, encrypted one or more times for the various CRAs. Because the wrapped value of the named, encrypted NAC would never change from the time it is created, it can simply be included in every message as a opaque blob. The Originator of the message or file would be able to decrypt the NAC, if necessary, using the private key of the SPED, and any authorized CRA would be able to decrypt that NAC, but the various Recipients would not be able to decrypt it, because it was not encrypted using their keys. In order to decrypt the message, the Recipient would have to have received their own copy of the NAC, encrypted in their own public key, in order to decrypt and apply the NAC and subsequently decrypt the message.

Assured Protection Against Tampering Via an Independent Guard Processor

In an optional embodiment, means are provided through which an independent Guard Processor computer or mechanism can verify that the entire contents of any encrypted file or other form of data were properly encrypted and have not been tampered with or accidentally modified since that time. The means makes use of a secure hash function that is computed by the SPED contemporaneously or simultaneously with the encryption operation, with the resulting hash function being digitally signed by the Originator's digital signature key and the signature being embedded in the file metadata or trailer along with the public signature key to be used for verification. In this embodiment, the validity of the Originator's public key can be established through a trusted out-of-band mechanism, e.g., an X.509 certificate that is signed by a trusted Certification Authority, or one or more public key or authorized Originators that are securely installed in the Guard Processor under the System Security officer's control. Through this means and apparatus, the authenticity of the ciphertext can be established without any necessity for the Guard Processor to require or even possess the ability to decrypt the information.

In some environments, the Recipient may not have received out-of-band confirmation of the Originator's public signature key, which might allow an attacker to substitute a bogus public key in the file metadata (trailer). In order to prevent this from occurring without detection, preferably the SPED includes the Originator's public signature key (as obtained from the file metadata) within the Key Derivation Function that is used by both the Originator and a Recipient to derive the Key Encrypting Key used to encrypt the File Encryption Key. If the Originator's public key were modified in the file, the Recipient would not be able to rederive the key necessary to decrypt the file, and the process would fail.

In another embodiment of the present invention, the Guard Processor function may be implemented in software on a user's HCD, and used to block or filter all information that has not been properly encrypted from being written to (or alternately read from) another mass encryption device or other media, unless it has been properly encrypted, in order to prevent the leakage of sensitive plaintext information.

Additional Sped Embodiments

Numerous variations and additions to the SPED can be made, without departing from the scope of the invention.

Robust File-Based End-to-End Error Correction Means and Mechanism

Optionally, various forms of Forward Error Correction (FEC) may be included within the encoded structure of the encrypted file itself, logically after the file has been encrypted and hashed as part of the digital sealing mechanism. In order to minimize the latency involved, FEC may be applied while the file is being encrypted and the ciphertext hashed, all in a single pass. During the decryption process, any existing errors will be corrected prior to hashing the encrypted file and perform the decryption operation. As will be understood by those skilled in the art, various forms of Forward Error Correction can be applied, including but not limited to simple Reed-Solomon (255,233) code, wherein 233 bytes of data plus 32 bytes of parity information are encoded into a 255 byte block. Such a code can correct up to 16 short bursts of error. More complex coding techniques, such as Cross-Interleaved Reed-Solomon Coding (CIRC) technique used in Compact Disks can completely correct error bursts of up to 4000 bits. The use of such techniques can enable the complete recovery of encrypted messages that might otherwise be rendered completely unintelligible due to as little as a single bit error.

Provision of an Adjunct Enhanced Authentication Device

The SPED can be connected to an optional Enhanced Authentication Device ("EAD"), which contains a biometric fingerprint scanner that compares the fingerprint input data to fingerprint templates previously registered and stored within the SPED. This apparatus provides an additional authentication factor of "Who you are" to positively identify the user as the legitimate unique user, or one of a set of authorized users who has previously registered their fingerprints on the SPED to strongly and securely bind their identity as an authorized user to access the operations on the SPED.

In a further embodiment, the optional EAD takes the form of a covering sleeve and includes a secure PIN entry mechanism to allow the PIN or password to be entered directly into the SPED without the need to communicate the PIN over an external or unprotected communications channel.

User Authentication Combined With Proximity Detection

In another embodiment, the proximity of the authorized user to the SPED may be confirmed by means of an RFID tag, Bluetooth device, or other limited near-field or wireless communications mechanism that is normally worn on or attached to the user's person, and may be "paired" to either the SPED or the EAD, so that if the user leaves the immediate area of the SPED that condition will be sensed, and the user required to log on again before taking further actions with the SPED. Other sensors and more exotic applications could likewise be supported, including live finger determination, blood-alcohol content, two-man rule conditions, etc.

Extensions of the Authentication Mechanism to Fuzzy Multivariate Factors

In some cases, the normal mode of operation would be for the SPED to be used within limited geographical locus, e.g., within a corporate campus, and use outside of that locus would be prevented. Rather than storing the authorized locus and comparing it to the current position, with the risk that it might be possible to extract the authorized coordinates and determine how to spoof the device, in another embodiment this geographical locus can be managed by having the EAD determine the current geographical position. (e.g., from a GPS or Loran system, or by triangulation form cell phone towers or similar means), and then apply a coordinate transformation to effectively round both the X and Y coordinates to define a more limited precision locus. This "fuzzy" or limited-precision locus can then be used as one of the authentication and authorization parameters that are entered into the secret-sharing authentication algorithm at the time the SPED is initialized and the keys are generated, just as the user PIN, Host Authorization Code, an/or other authorization parameters are entered.

In yet another embodiment, the extension of the authentication and authorization parameters from what is effectively a precise, one-dimensional Host Authorization Code to a fuzzy two-dimensional geographic position locus can be extended to three or more dimensions, including altitude, time or day, or other multivariate coordinates. For example, many pattern-matching algorithms used in biometric applications can be viewed as a multi-dimensional variation around a known point, which is determined by the biometric template or indicia. In this embodiment, the template would be entered into the secret-sharing authentication and authorization algorithm, and the allowable degree of deviation from that template would be implemented through the coordinate transformation and truncation or rounding algorithm, so that it would not be necessary to store the template itself for comparison where it could possibly be compromised. Those skilled in the art will recognize that it is desirable to ensure that a sufficient amount of entropy be provided during this process, so as to make it computationally infeasible to guess or exhaustively search for parameters that would satisfy the enhanced authentication/authorization criteria. This objective can be accomplished by combining a multiplicity of such parameters into a single split-knowledge share. If necessary, a random seed, serial number, or other variable that is unique to a particular enhanced authentication device may be hashed or otherwise combined with the relevant parameters in order to make it more difficult to mount an exhaustive search.

Extensions to Multiple Cryptographic or Application Partitions

In another further embodiment, the SPED is constructed with a multiplicity of logical cryptographic or application partitions, in order to permit sharing a single SPED among or between multiple users, as in a branch office, or engineering design or finance group, where each user can have access to their own unique private keys. In other cases, e.g., within a military or surveillance operation, multiple users of the same device can be authorized, each with their own PIN or password and optional biometric identifier, but the various users can all share access to a common set of decryption keys, for purposes of survivability. In that scenario, each user might or might not have unique digital signature keys.

In a similar embodiment, the SPED can be constructed with a multiplicity of logical cryptographic or application partitions, so that certain less sensitive applications can be performed without requiring the Host Authorization Code or other authorization parameters to be stored externally, while still requiring the HAC for the more sensitive applications. One such application would be the use of the SPED for pre-boot authentication of a Full Disk Encryption software or hardware application, where there is no secure location in which to store a HAC until the operating system has completed the boot process, and hence it would be desirable to use independent HACs for maximum security. Another such application would be the use of the SPED to access Multiple Independent Security Levels when dealing with a classified environment. One set of user PIN/password, HAC, and biometrics might authorize access to a host computer at the Unclassified level, another set at the SECRET level, and yet another set at the TOP SECRET level. If a particular user or SPED is not authorized to access the higher level security classifications, the HAC for that classified enclave security level would not be loaded onto the SPED by the Security Officer.

In yet another embodiment, a multiplicity of independent SPEDs, either with or without the capability of interfacing to a removable memory device, may be aggregated into a single physical device containing multiple SPED devices, all capable of functioning independently at different security levels, and connected to the HCD by a multi-pin plug and socket arrangement containing e.g., as many as 16 different connecting pins, as may be required to support the I/O requirements. Each SPED could then be dedicated to distinct security levels, e.g., Unclassified, CONFIDENTIAL, SECRET, and TOP SECRET, providing complete electrical as well as application and cryptographic separation between levels.

Interfaces to Other Media

In a further embodiment, the SPED may take the form of a digital media recorder/receiver or an "iPod" type device, which includes a large capacity micro disc hard drive or internal mass memory chip, and connects to the host computing device through a miniUSB or adapter cable connection, or wireless connection, depending upon the native interface of this SPED. A touch screen display may enable a keyboard to be presented to the user to provide a means for entering a PIN number directly into the SPED without transporting the PIN from an unprotected external device and communications channel.

In a further embodiment, a SPED apparatus is constructed and enabled to also perform one or more cryptographic operations on data that has been transmitted to the SPED by a remote wireless device by inclusion of a wireless transceiver, or input to the SPED by a person through a keyboard, or input to the SPED by another peripheral device (e.g., digital camera, disk storage module) through an additional secondary physical connector and communications port.

In another embodiment, the host computing device may be a programmable product such as laptop, desktop or UltraMobile PCs, a PDA cell phone, a digital audio or video recorder, a photographic camera or recorder, with an embedded microprocessor that supports applications software, peripheral device interfaces, and graphical user interfaces, and operates on digital data in any format (e.g., encoded alphanumeric, video, audio, photographic).

Use of the SPED for Biometric Authentication

The SPED 610 and an associated peripheral device driver may be implemented so that it is possible to use the functionality of the SPED, even without accessing any cryptographic processing functions of the SPED. Using the SPED in this way can be useful, for example, when the targeted functionality (referring to FIG. 6) is embodied as the secure PIN entry/biometric authentication device 620, previously described, that is used to perform user authentication. In particular, if device 620 is to be used as the mechanism to enter the user PIN in FIG. 7 step 704, operation in this mode may be necessary (depending on the capabilities of the biometric device) to enable such use of the biometric device.

The biometric authentication device is defined herein as any device that is adapted to receive input data regarding a physical characteristic of a person based upon a physical interaction of the person with the device. Biometric devices that can be used in a peripheral device can include, for example, a fingerprint-scanning device, a retinal scanning device, or a face print scanning device. A biometric device includes a sensor for sensing the physical characteristic, and an analog-to-digital converter to transform the analog data representing the sensed characteristic into digital data. For example, a fingerprint-scanning device includes a sensor upon which a person can place or swipe a finger, the sensor sensing the fingerprint of the finger, the content of the sensed fingerprint being converted into digital data by the device. Similarly, a retinal scanning device includes a sensor that can be placed proximate to a person's eye, the sensor sensing characteristics of the eye such as blood vessel pattern or iris pattern, the device translating the content of the sensed characteristics into digital data. The construction and operation of biometric devices in general, as well as those identified particularly above, is well understood by those skilled in that art, so that, together with an understanding of the required communication capability between the biometric sensor and the control processor 620, a biometric device for use with the invention can be easily operated. Fingerprint scanning devices and retinal and face print scanning devices that can readily be modified for use with the invention, i.e., to communicate with the control processor 620, are known to those skilled in that art.

In a further embodiment, the secure PIN/biometric device 620 contains a human input device 623 for scrolling through alphanumeric characters that are sequentially displayed on display screen 624. As each desired character appears on the display screen 624, a selection is made and the character is locked. After the correct sequence of characters is entered, they can be entered as the PIN, in one embodiment, by scrolling the thumbwheel to an "enter" position and pressing inward. The secure PIN entry is transferred to the SPED cryptographic processing configuration modules 611, 612, and 613 via control processor 621 and I/O modules 625 and 616 to determine authentication approval by matching the stored PIN data.

If biometric approval is also required as an authentication procedure, the biometric scanner 622 may be used to scan the user's biometric fingerprint data into the SPED control processor 621 according to the particular instructions and settings of the scanner parameters. If a correct match is made after comparing the biometric data to an appropriate library of biometric data representing a predetermined group of people (e.g., authorized users) stored within the processor 621, the resultant user authentication approval is sent from the control processor 621 via I/O modules 625 and 616 to the SPED microprocessor 611. (Of course, in this case, user authentication is used as part of the step 714). Again, eventually, use of the SPED device ends (step 719).

Embodiments Utilizing Wireless Communications

Figure 9:
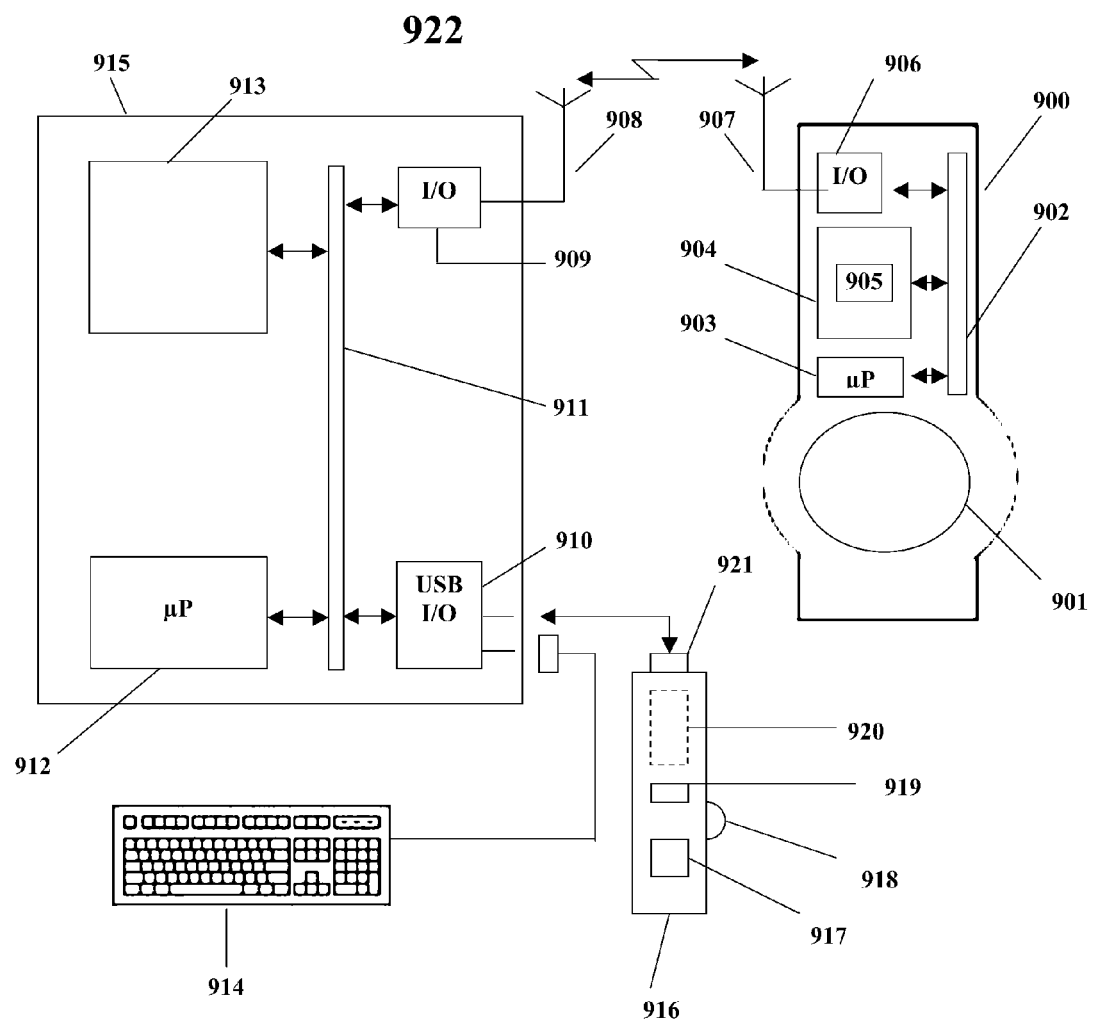
FIG. 9 is a block diagram of another embodiment of the physical implementation of the system with security operations executed by software within the SPED.

A further system embodiment 922 is illustrated in FIG. 9. In this configuration 922, the HCD 915 is similar to that presented in FIG. 5 and can take the form of some portable form factor physical configuration for a PC, a PDA phone, a smartphone or other such similar devices. The HCD 915 is comprised of a microprocessor 912, an internal memory 913, a computer bus 911 for interconnection of the internal components of the HCD 915, a data input mechanism for user input illustrated herein as a keyboard 914 which is connected to the HCD 915 through a USB input/output module and connector 910. Alternatively, a wireless connection can be used to interconnect a data input device 914 to the HCD 915. As previously described in FIG. 6, the host computing device executes the software modules 605, 606, 601, 602, and 607 necessary to interface with the secure portable encryption device and the secure portable encryption device mass memory. Referring to FIG. 9, the HCD 915 includes a wireless input/output module and connector 909 for communications to other devices using WLAN IEEE 802.11, Bluetooth, or such other wireless communications methods as may be adopted for industry use by handheld digital computer and communicating devices and host computing devices. Wireless communications is enabled by HCD 915 internal or external antenna 908.

Referring to FIG. 9, the secure portable encryption device 900 may be implemented in a form of digital data media recorder/receiver 900 containing an integrated or removable mass memory disc or mass memory chip module 901. This secure portable encryption device 900 also contains a control microprocessor 903, internal RAM memory 904, an internal communications bus 902, and input/output module and connector 906 which includes a wireless capability and is connected to internal or external antenna 907 through which communications is effected. Wireless communications can utilize a method such as Bluetooth, WLAN IEEE 802.11 protocols, or other methods adopted by industry providers. Wireless communications can be implemented using one of the industry security methods (e.g., WAP2 IEEE 802.11i, Bluetooth mutual authentication method for encryption key generation) for establishing a mutually authenticated ephemeral session encryption key between the HCD 915 and the SPED 900 in order to secure communications of critical security parameters that are exchanged between the HCD 915 and the SPED 900.

This configuration 922 may execute all security operations as have been previously described for occurring within the secure portable encryption device 900 for protection of the SPED memory 901 data by means of software stored in a partition 905 of the internal memory, or alternatively and not illustrated, in a separate EEROM memory connected to computer bus 902. The control microprocessor 903 processes all memory applications, initialization applications, generates the ephemeral polynomial curve from which the "N" shared secrets and Master Key Encryption Key (MKEK) are created, and performs the security processing operations necessary to cryptographically associate each shared secret with an external secret, (e.g., the user PIN, the security officer PIN, the unique identifier for the HCD, the identification of the specific secure portable security device), and all other cryptographic algorithms and related memory storage applications as are required and store such values in non-volatile permanent memory of the SPED.

The system secret sharing means implemented by the SPED 900 control microprocessor 903 and security processing programs stored in memory 905 do not require static storage of the external secrets and the MKEK and thus provides the advantage of avoiding these vulnerabilities which are subject to brute force and other attacks. Installation and initialization software modules (not illustrated) as previously discussed may also be stored within the SPED 900 to be directly downloaded to a HCD 915 without the necessity of using a separate digital media, e.g., CD-ROM.

As previously discussed, user authentication can be implemented by PIN input through the data entry device 914 for the HCD 915, or, for additional levels of secure authentication, through a separate biometric and secure PIN entry device 916, configured in this embodiment in a USB flash memory portable form factor. Other form factors may also be implemented. The biometric authentication device 916 is connected to the host computing device through a USB connection 921 which mates with the USB input/output and connector module 910 on the HCD 915. The biometric authentication device 916 may be comprised of a biometric sensor depicted in FIG. 9 as a fingerprint sensor 917, a scrolling thumbwheel 918 for selection and input of the alphanumeric characters to compose the PIN, a display 920 to provide status to the user, and an internal control microprocessor 919 for execution of all operations.

The choice of algorithms and techniques for encryption/decryption, digital hashing, digital signing, and other related operations associated with these operations is not meant to be limited by this disclosure. Such choices are expected to change over time, due to new standards being set by governments and institutions and standards-making bodies for acceptance by all communities, and this invention is not limited, in implementation, to any one set of such cryptographic algorithms and techniques.

It is to be understood that the various configurations and embodiments of the system, methods, and apparatus which have been described are merely illustrative, not limitative, of an application of the principles. It will be apparent to one skilled in the art that numerous modifications may be made to the system configurations, methods, and apparatus described herein without departing from the scope of the claims set out below.

What is claimed is:

1. A portable encryption device in which data access is controlled by an encryption key, comprising:
   an enclosure for the device providing a portable form factor, and
   a cryptographic processor within the enclosure for
   (i) splitting the encryption key into N shares,
   (ii) shrouding each of the N shares with one or more external secrets, where one of the external secrets is a network authorization code which has been generated and distributed to a community of interest through an out-of-band distribution mechanism,
   (iii) designating one or more of the N shares as enabling, provided that at least one of the one or more so designated enabling shares has been shrouded with the network authorization code, and
   (iv) reconstituting the encryption key from K of the N shares, where K<N and at least one or more of the K shares is enabling.

2. The device of claim 1, in which the data access comprises logon access.

3. The device of claim 1, in which the data access comprises file decryption.

4. The device of claim 1, where an external secret shrouding one or more of the shares may be changed without changing the encryption key.

5. The device of claim 4, where the secret to be changed comprises a user's PIN.

6. The device of claim 5, where the PIN is a supervisory user's PIN.

7. The device of claim 4, where the secret to be changed comprises a firmware hash.

8. The device of claim 4, where the secret to be changed comprises a host authorization code associated with one or more specific host computing devices.

9. The device of claim 4, where the secret to be changed is generated by a proximity detection mechanism.

10. The device of claim 1, further comprising means for communicating the external secrets over a secure channel with a secondary device.

11. The device of claim 10, where the secondary device is a connected host computing device.

12. The device of claim 10, where the secondary device is a remote device.

13. The device of claim 1, where the encryption key is a master key encryption key.

14. The device of claim 1, where the encryption key is an application key encryption key.

15. The device of claim 1, further comprising means for interfacing with a user authentication device.

16. The device of claim 15, where the authentication device comprises a secure PIN entry mechanism.

17. The device of claim 15, where the authentication device comprises a secure biometric input.

18. The device of claim 1, further comprising removable memory configured for data storage.

19. The device of claim 1, further comprising a data communication module.

20. The device of claim 1, where the cryptographic processor is a microprocessor programmed to execute cryptographic functions.

21. The device of claim 1, further comprising a second cryptographic processor within the enclosure.

22. A method for controlling data access on a portable encryption device having a portable form factor and a cryptographic processor, comprising:
   generating a first plurality of secrets by a secret sharing algorithm operating upon an encryption key,
   shrouding each of the first plurality of secrets with external secrets, provided that a network authorization code has been generated and distributed to a community of interest through an out-of-band distribution mechanism and that at least one of the first plurality of secrets has been shrouded with such code,
   assigning a class designator to one or more of the shrouded secrets, wherein the class designator indicates that the shrouded secret is required for reconstitution of the encryption key, provided that at least one of the so designated shrouded secrets has been shrouded with the network authorization code, configuring the cryptographic processor to reconstitute the encryption key from a second plurality of the first plurality of generated secrets, wherein the second plurality includes all required shrouded secrets, and determining data access as a function of the reconstituted encryption key.

23. The method of claim 22, where the data access comprises logon access.

24. The method of claim 22, where the secret sharing algorithm comprises Shamir's Secret-Sharing Algorithm.

25. The method of claim 22, where the data access comprises file decryption.

26. The method of claim 22, wherein any one of the external secrets may be changed without regeneration or re-dealing of all of the first plurality of secrets.

27. The method of claim 26, where one or more of the external secrets comprise a user's PIN.

28. The method of claim 27, where the PIN is a supervisory user's PIN.

29. The method of claim 26, where the external secrets comprise a plurality of user's PINS, and the encryption key can be reconstituted with less than all of the plurality of user's PINS.

30. The method of claim 26, where one or more of the external secrets comprise a firmware hash.

31. The method of claim 26, where one or more of the external secrets comprise a host authorization code associated with one or more specific host computing device, binding the portable encryption method to such one or more host computing devices.

32. The method of claim 26, where one or more of the external secrets is generated by a proximity detection mechanism.

33. The method of claim 26, where one or more of the external secrets is a function of multivariate parameters.

34. The method of claim 33, where the multivariate parameters are chosen from the group consisting of a geographic-locus and biometric input.

35. The method of claim 22, further comprising communicating the external secrets over a secure channel to a secondary device.

36. The method of claim 35, where the secondary device is a host computing device.

37. The method of claim 35, where the secondary device is a remote device.

38. The method of claim 22, where the encryption key is a master key encryption key.

39. The method of claim 22, where the encryption key is an application key encryption key.

40. The method of claim 22, further comprising receiving input from a user authentication device.

41. The method of claim 40, where the input is received over a secure channel.

42. The method of claim 40, where the input comprises secure biometric data.

* * * * *